(12) United States Patent
Sri-Jayantha et al.

(10) Patent No.: US 6,574,065 B1
(45) Date of Patent: Jun. 3, 2003

(54) METHOD AND APPARATUS FOR ADAPTIVE RESONANCE MODE CANCELLATION SERVO IN A ROTATING STORAGE SYSTEM

(75) Inventors: Sri M. Sri-Jayantha, Ossining, NY (US); Arun Sharma, New Rochelle, NY (US); Hien Dang, Nanuet, NY (US); Tetsuo Ueda, Sagamihara (JP); Kenji Okada, Yokohama (JP); Hideo Asano, Machida (JP); Tatsuya Endoh, Fujisawa (JP); Masayuki Takeuchi, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,307

(22) Filed: May 14, 1999

(51) Int. Cl.$^7$ ............................................. G11B 21/02
(52) U.S. Cl. ....................................................... 360/75
(58) Field of Search .............................. 360/46, 65, 75; 375/229, 350, 231; 333/174, 175

(56) References Cited

U.S. PATENT DOCUMENTS

| | | | | | |
|---|---|---|---|---|---|
| 4,067,059 | A | * | 1/1978 | Derchak | ...................... 364/200 |
| 5,285,431 | A | * | 2/1994 | Ogawa | ......................... 369/32 |
| 5,455,717 | A | * | 10/1995 | Van Doorn et al. | ............. 360/6 |
| 6,014,285 | A | * | 1/2000 | Okamura | ................. 360/78.04 |
| 6,130,590 | A | * | 10/2000 | Kolsrud | ...................... 333/174 |
| 6,151,614 | A | * | 11/2000 | Ikeda | ......................... 708/322 |
| 6,188,191 | B1 | * | 2/2001 | Frees et al. | ................. 318/560 |

* cited by examiner

Primary Examiner—David Hudspeth
Assistant Examiner—Mitchell Slavitt
(74) Attorney, Agent, or Firm—Kevin M. Jordan, Esq.; McGinn & Gibb, PLLC

(57) ABSTRACT

A method and apparatus for adaptive resonance cancellation in a rotating storage system, includes designing a set of digitally selectable optimum resonance cancellation filters, generating a series of excitation signals for injection into the filters, generating a characteristic resonance frequency based on the excitation signals, and computing an address pointer corresponding to the resonance frequency, to select an optimum resonance cancellation filter.

33 Claims, 18 Drawing Sheets

FIG. 3A
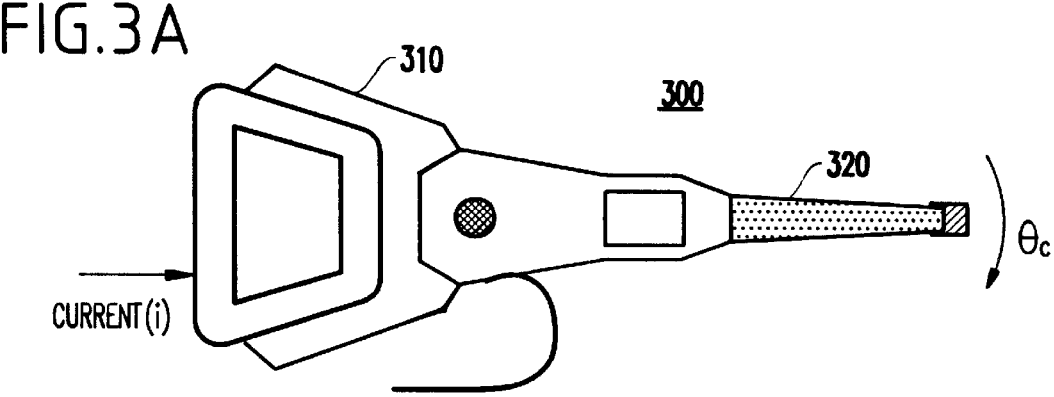
FIG. 3B
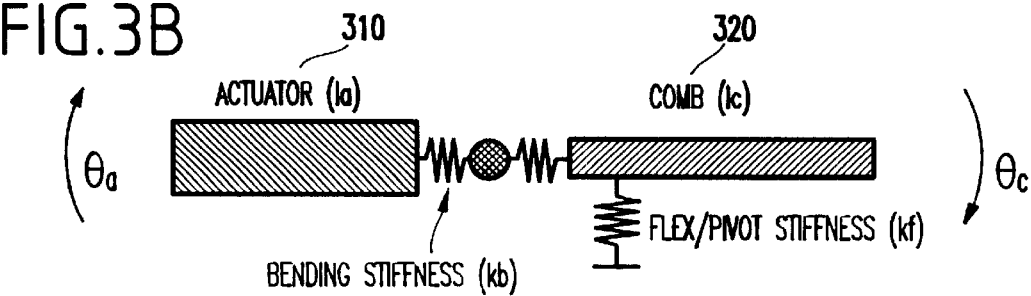
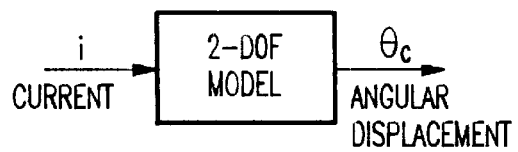
FIG. 3C
$\underline{\dot{x}} = A\underline{x} + Bu$ (DYNAMICS)
$y = C\underline{x}$ (MEASUREMENT)
e.g., $C = [\,0\ 0\ 1\ 0\,] \Rightarrow y = \theta_c$
or $\phantom{.} C = [\,0\ 1\ 0\ -1\,] \Rightarrow y = \dot{\theta}_a - \dot{\theta}_c$
$$\underline{x} = \begin{bmatrix} \theta_a \\ \dot{\theta}_a \\ \theta_c \\ \dot{\theta}_c \end{bmatrix}$$

| A TYPICAL TABLE OF PARAMETERS LOADED INTO A DRIVE | | | | | | |
|---|---|---|---|---|---|---|
| Bin # | Clock Divider | Sine Generating Peak Filter | OptimumNotch Fltr | Precomputed q | Precomputed r | PES Variance or Ratio of Variances y |
| | | | | | | |
| | | | | | | |
| | | | | | | |
| | | | | | | |

METHOD AND APPARATUS FOR ADAPTIVE RESONANCE MODE CANCELLATION SERVO IN A ROTATING STORAGE SYSTEM

BACKGROUND OF THE INVENTION

1. Field of the Invention

The present invention generally relates to a rotating storage system, and more particularly to a disk drive system having an adaptive resonance mode cancellation servo.

2. Description of the Related Art

A disk drive sector servo system with a 500 Hz open loop crossover frequency can meet a 15 kTPI (tracks per inch) track-following accuracy requirement.

However, the growth of track density to higher than 25 kTPI (e.g., expected by year 2000) has emerged as a major challenge to the actuator and servo system design. Mechanical system resonance is one of the limiting factors to obtaining higher bandwidth control. Using microelectromechanical devices has been studied to increase actuator response characteristics.

Innovation in the actuator system design to increase the servo-crossover frequency is desirable. However, the storage industry needs cost-effective innovations in servo system design methodology that preserve the time-proven actuator system concepts while meeting the high track density requirements.

There are several actuator resonance modes found in a 3.5" rotating storage system. The first important mode occurs around 3 kHz, and is understood to arise from bending of the actuator voice coil motor (VCM) around its pivoting point. This bending mode characteristic is sensitive to temperature, pivot parameters and other properties of a disk drive.

A conventional approach to managing the presence of this first mode has been to introduce a "deep" digital notch filter in series with the servo controller during a seek and track-follow mode. A notch filter (or sometimes simply referred to as a "notch") reduces the negative effect of a rise in the transfer function gain that occurs due to the coil bending resonance (CBR).

Due to the temperature-induced drift of the resonance frequency, as well as the manufacturing variability encountered within a manufactured product population, the conventional digital notch filters have been designed to have broader-than-required attenuation bandwidth (e.g., an "overdesign" or an "overkill" of the mode), thereby resulting in a corresponding phase loss in the crossover region of the servo loop. The loss of phase in turn limits the achievable crossover frequency of the track-follow servo system.

Thus, using a traditional "deep" notch to handle the operating requirement has become a limiting factor.

It is noted that the conservative "deep" notch design can be somewhat favorably enhanced by conducting tests in a manufacturing line for each product. However, the design still produces excessive phase lag because of having to compensate for temperature-induced drift. Further, it cannot effectively support high track density products beyond 25 kTPI. This is unacceptable given that the track density (TPI) is expected to be well above 25 kTPI in 2000 and beyond.

Further, it is noted that adaptive control methods including system identification techniques have been theoretically proposed to optimize servo systems. However, because of the mathematical complexity and signal processing power required to implement these techniques, these theoretical methods have not been implemented or designed yet for the conventional servo system architectures found in present storage products.

Further, the conventional adaptive control solutions attempt to solve a broader problem of model structure, model order, and controller parameter determination simultaneously, thereby leading to a computationally demanding and intensive approach.

Additionally, no low cost signal generation capability exists in the conventional systems and methods.

SUMMARY OF THE INVENTION

In view of the foregoing and other problems of the conventional methods and structures, an object of the present invention is to provide a method and structure in which improved servo bandwidth and decreased phase loss are achieved.

Another object is to develop a simpler and implementable solution, as compared to the conventional systems, such that the known aspects of the system are incorporated innovatively so that the unknown parameter set that must be determined within a product setting becomes manageable.

For example, if a resonance mode is known to exist, then it is sufficient to search for the mode within a pre-specified frequency range instead of treating it as a completely unknown parameter.

Thus, yet another object of the present invention is to provide a simple and effective method to solve the resonance uncertainty problem as described above.

In a first aspect of the present invention, a methodology is provided to optimize control system properties by detecting and configuring a resonance mode cancellation filter.

In the first aspect, the methodology (and apparatus) includes designing a set of digitally selectable optimum resonance cancellation filters, generating a series of excitation signals for input to the filters, generating a characteristic resonance frequency based on the excitation signals, and computing an address pointer corresponding to the resonance frequency, to select an optimum resonance cancellation filter.

In a first embodiment of the present invention, an optimum resonance mode cancellation solution is proposed using a "shallow" notch which is more effective and efficient in contrast to a conservative "deep" notch. That is, the "shallow" notch provides a phase margin improvement of about 20% at around the 500 Hz crossover region.

The method of the first embodiment of the present invention shows that the conservative "deep" notch design that produces about a 10-degree phase lag can be replaced by an "optimum" notch with a phase lag of less than 3 degrees with a software-based solution, without any actuator modification. The phase enhancement improves the error rejection capability of a sector servo system which allows higher track density storage products to be realized. The increased phase margin can alternatively be traded-off to achieve increased open-loop crossover frequency.

Additionally, the present inventors have found that an optimum mode cancellation solution requires close matching of the CBR, which leads to a second embodiment of the present invention that relates to resonance frequency determination.

In the second embodiment, the invention provides a comprehensive CBR frequency determination and mode cancellation method which requires an in-situ method to generate a near-sinusoidal signal at low cost for resonance excitation, a least square algorithm to determine the resonance frequency location and an address pointer to extract the stored notch parameters, all using available product resources. These functions are achieved without lengthy or complex mathematical operations. Methods have been developed, tested and demonstrated on two separate storage product platforms to validate the method and structure of the present invention.

In a third embodiment, alternative ways to further simplify the implementation requirements of the present invention are provided by utilizing a priori known CBR characteristics.

Specifically, the present invention identifies the predictable dependency of CBR frequency on temperature and eliminates a "wider" and "deeper" conservative fixed frequency notch by adaptively selecting pre-designed and pre-stored optimum notch parameters (e.g., in a table or the like) based on an internal temperature sensor measurement.

The temperature sensor-based resonance mode prediction is fine-tuned further by an in-situ learning process in which the temperature vs. resonance sensitivity relationship over a period of time during the service life of a disk drive is captured and stored such that long-term system variations are gradually compensated.

An optimal location of the temperature sensor to provide accurate resonance data is also defined. Further, the invention may be embodied as a computer implementable program stored in a signal-bearing medium.

With the unique and unobvious aspects of the present invention, wider servo bandwidth and decreased phase loss result, with a simple system not requiring a "deep" notch. Along these lines, no "overdesign" is required to process a mode. That is, the notch parameters are optimized to the mode to provide a substantially linear function of notch characteristics to mode frequency.

Thus, the present invention easily and efficiently optimizes control system properties by detecting and configuring a resonance mode cancellation filter with an optimum notch for each mode frequency.

BRIEF DESCRIPTION OF THE DRAWINGS

The foregoing and other purposes, aspects and advantages will be better understood from the following detailed description of preferred embodiments of the invention with reference to the drawings, in which:

FIGS. 3A–3C illustrate a two-piece model for coil bending resonance (CBR) including a conventional actuator 310 in FIG. 3A, an actuator and comb 320 as two rigid pieces in FIG. 3B, and a state variable representation of the two-piece system in FIG. 3C;

DETAILED DESCRIPTION OF PREFERRED EMBODIMENTS OF THE INVENTION

Figure 1:
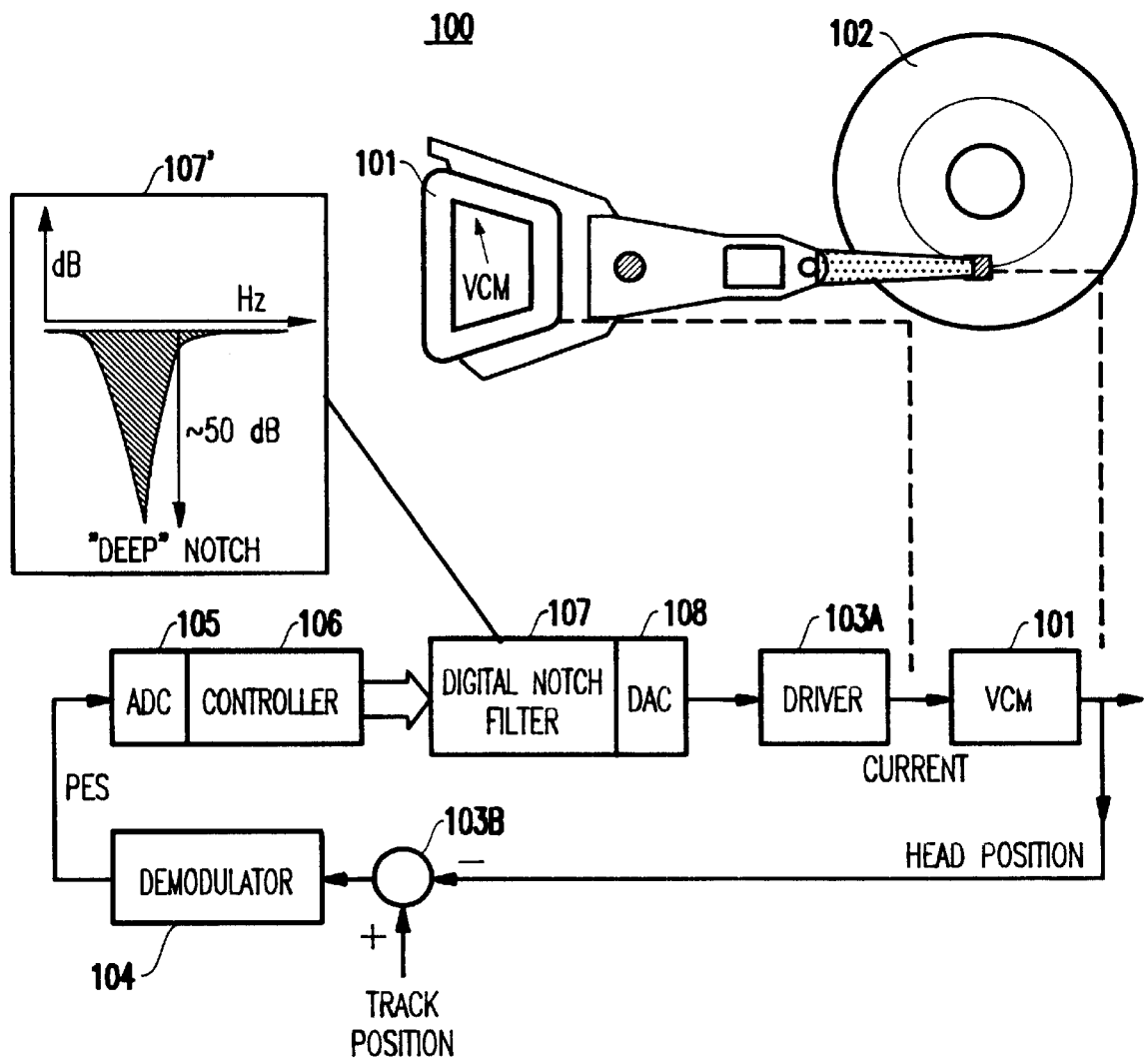
FIG. 1 illustrates a conventional disk servo system 100 with a notch filter 107.

Referring now to the drawings, and more particularly to FIGS. 1–21, there are shown preferred embodiments of the method and structure according to the present invention.

As mentioned above, the present invention provides a methodology to optimize control system properties by detecting and configuring a resonance mode cancellation filter.

In a first aspect, the methodology includes designing a set of digitally selectable optimum resonance cancellation filter, generating a plurality (series) of low cost (e.g., having approximate sinusoidal waveforms) excitation signals, implementing an algorithm to generate the characteristic resonance feature, computing an address pointer corresponding to the resonance frequency, and optionally simplifying the implementation by using a temperature sensor.

Prior to describing the invention in detail, the conventional systems and techniques will be briefly described, to provide a clear comparison with the present invention.

It is noted that using notch filters to attenuate resonance in feedback control mechanism is generally known. For example, FIG. 1 shows a conventional system 100 containing an actuator and its servo system found in a disk drive. The system 100 includes a voice coil motor (VCM) 101 for reading from/writing to a disk 102.

As shown, the feedback loop includes a driver 103A for driving the VCM 101. The head position of the VCM 101 is controlled by the feedback loop including a summing circuit 103B receiving a track position signal, a demodulator 104 for producing a position error signal (PES), an analog-to-digital converter (ADC) 105 for converting the analog PES to a digital signal, a controller 106 for controlling the filter based on an input from the ADC 105, a digital filter 107 (at least one filter, although a plurality of filters may. be used depending on disk size, system characteristics, etc.) initially receiving a stored state of the filter, and a digital-to-analog converter 108 for providing the signal to the driver 103A. Some exemplary characteristics of the "deep" notch filter are shown in the blow-up portion 107' of FIG. 1.

When a dynamic system, such as a disk drive actuator, that requires a notch is subjected to parameter variation in the field, an opportunity to tune the notch filter 107 is also anticipated in the conventional systems. However, the programmable notch concept in a variable parameter system has not been used in low cost disk drives because, for example, of the high power (and expensive) digital signal processor (DSP) required to realize the complex system identification algorithms.

Moreover, in disk drives, in-situ identification methods have not been applied even in products with DSPs that demand a competitive design point, because of the lack of a practical process to identify the key features of actuator resonance mechanics.

Thus, the conventional systems use notch filters, but such systems have not been especially effective. Specifically, such notch filters have been designed to have a wide band which causes a relatively large phase loss (e.g., about 10 degrees at 600–800 Hz). Hence, the conventional systems have "over-designed" the notch filter in attempting to minimize the mode. That is, the conventional systems have an "overkill" capability in processing most modes since a "deep" enough notch must be provided to handle the entire frequency range.

Figure 2:
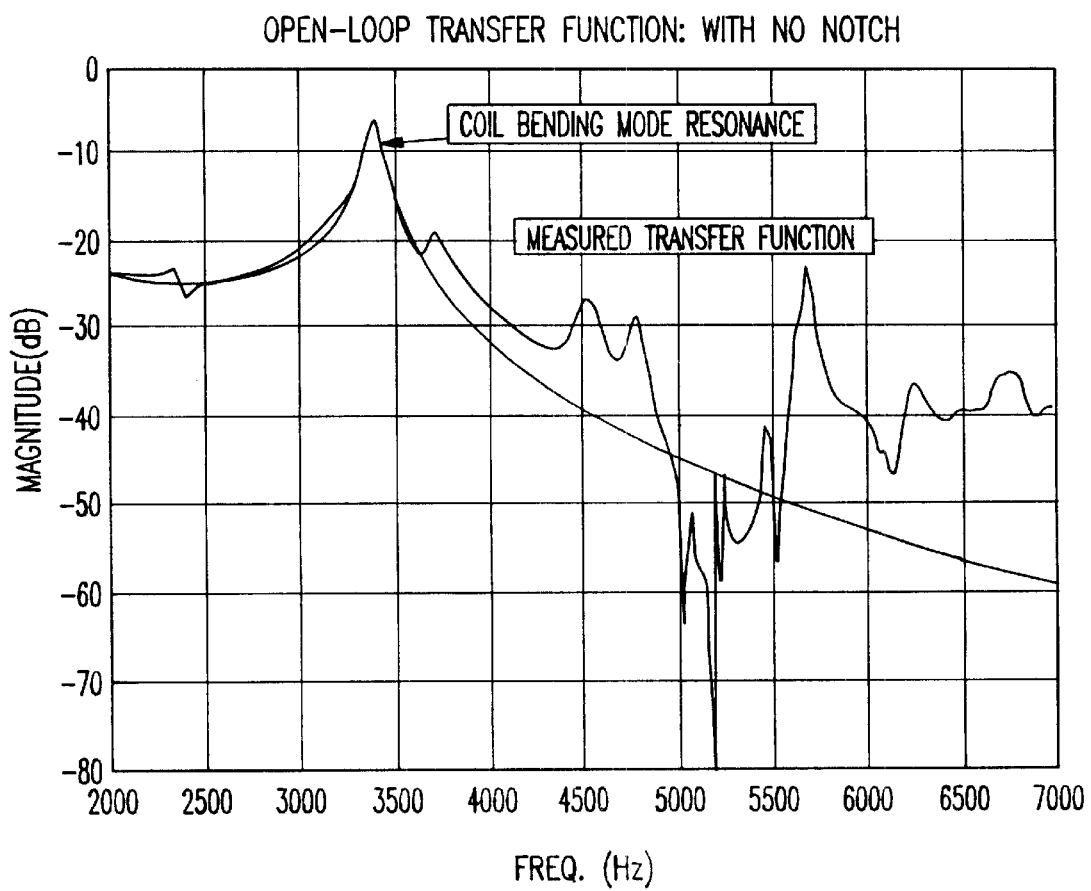
FIG. 2 illustrates a typical open-loop transfer function with the resonance modes.

A typical resonance of a 3.5" disk drive actuator, as shown in FIG. 2, has several resonance modes out of which the coil bending resonance (CBR) mode plays a dominant role (e.g., typically has highest peak) in determining the servo performance characteristics.

Two-Piece Actuator Model

A schematic (e.g., mathematical model) actuator 300 of a disk drive product, as shown in FIG. 3A, has an actuator portion 310 and a comb portion 320. The comb 320 carries the head suspension assembly. The actuator 310 generates a force that controls the motion of the magnetic read/write heads of the disk drive.

The actuator bending mode resonance can be modeled according to FIG. 3B where the coil portion is represented by an inertia (Ia) and the comb portion 320 is, represented by another inertia (Ic). The rigid body inertia (Ia+Ic) against the flex cable and pivot stiffness produces a low frequency resonance around 70 Hz. The coil bending dynamics gives rise to the CBR mode around about 3 kHz for a 3.5" actuator system.

A mathematical model for the system in FIG. 3B, as represented by FIG. 3C, can be developed. Parameters defining the dynamic system (e.g., matrices A, B and C) are selected by matching the low frequency and actuator CBR frequency, where vector x represents the state variable and scalars u and y denote control input and position or relative velocity output.

Figure 4A:
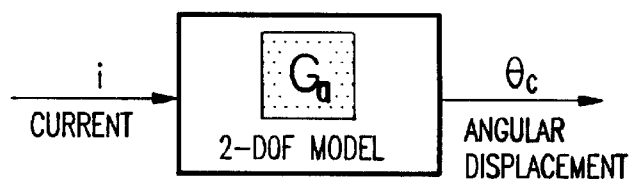
FIGS. 4A–4C illustrate a computed transfer function of an actuator current to comb rotation dynamics, with FIG. 4A illustrating a two degrees-of-freedom (DOF) model showing current being input to the model and angular displacement being output, FIG. 4B illustrating a mode (magnitude vs. frequency), and FIG. 4C illustrating phase vs. frequency.
Figure 4B:
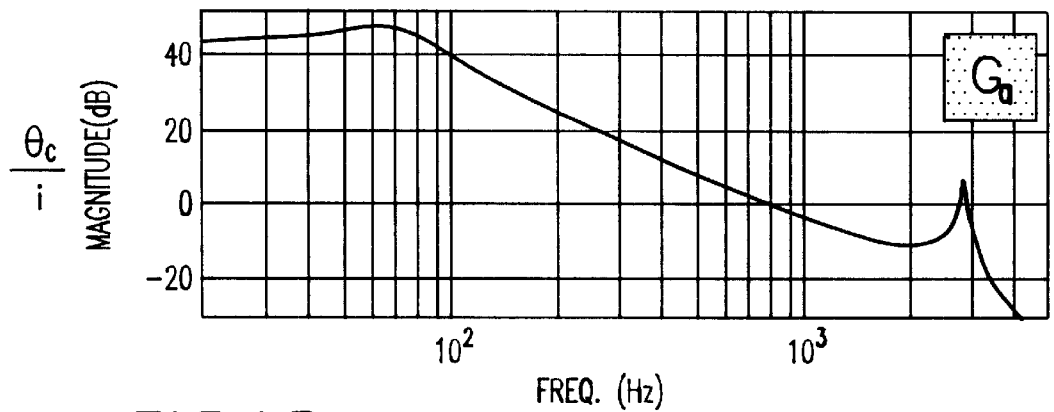
Figure 4C:
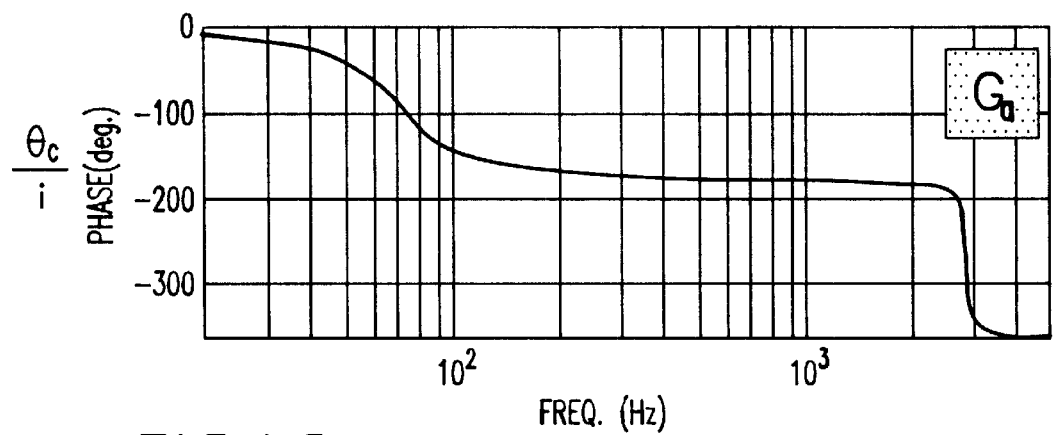

FIGS. 4A–4C show a computed transfer function for a particular actuator system. It is noted that in FIG. 2, an experimental and a modeled transfer function data are compared, and the data substantiates the effectiveness of a two-piece model in capturing the CBR characteristics. The two-piece model provides an effective tool in developing an optimal notch filter solution discussed below.

First Exemplary Step of the Present Invention

A notch filter can be cascaded (e.g., coupled, for example, in series) with the actuator model and an equivalent transfer function can be obtained.

By choosing the notch filter parameters accordingly, desired attenuation characteristics can be obtained. It can be shown that a combined transfer function can be generated to resemble a damped actuator system, without having to damp the device either electronically, mechanically, or structurally (physically).

Further, it has been found that a "shallow" notch (in contrast to a "deep" notch) produces the desired effect optimally, i.e., minimum phase loss while providing the necessary (in contrast to excess) attenuation.

Figure 5A:
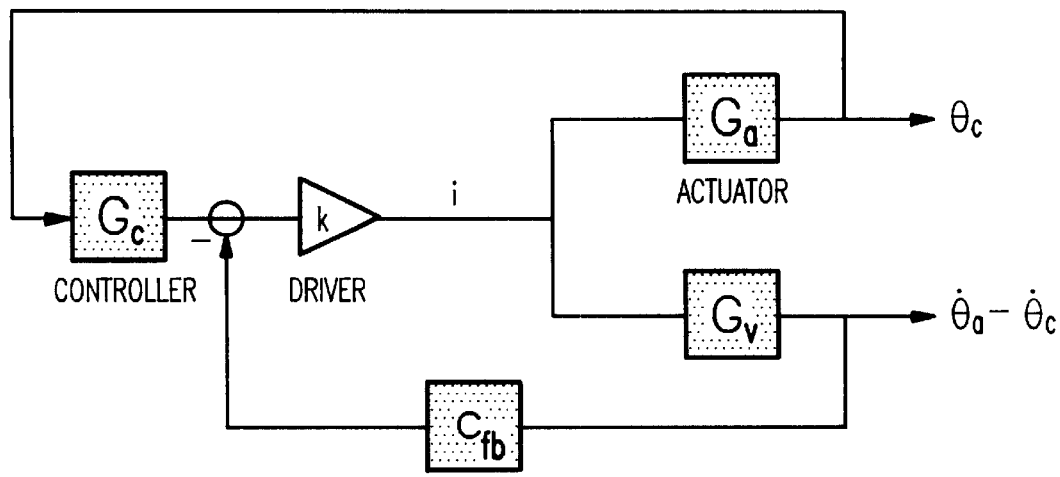
FIGS. 5A–5C illustrate a relative velocity feedback equivalence of a notch filter.
Figure 5B:
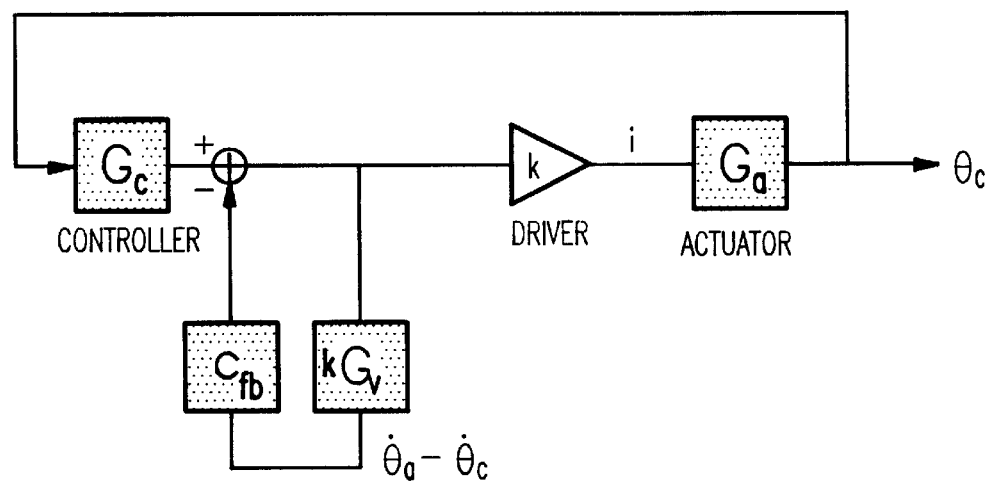
Figure 5C:
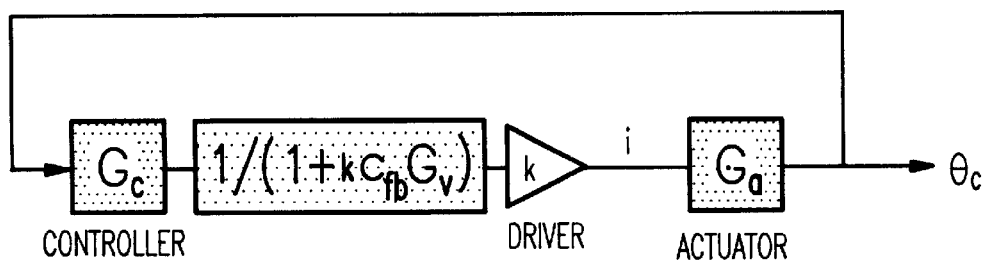

FIGS. 5A–5C show the equivalence of an optimum notch to that of an electronically damped system.

FIG. 5A represents a position feedback loop with a relative velocity feedback operation. That is, FIG. 5A is concerned with the mounting of, for example, a coil.

FIG. 5B is a feedback equivalent of FIG. 5A. The parameter "$C_{fb}$" represents the strength of the relative velocity feedback component. A higher value of "$C_{fb}$" means more damping in the form of feedback. A simplification operation using standard rules of block diagram algebra reveals that FIG. 5C is equivalent to FIGS. 5A and 5B. FIGS. 5A and 5B achieve mode damping by actively sensing the relative velocity component and blocking actuator current entering the VCM, whereas FIG. 5C simply blocks the VCM current without any knowledge of actuator bending dynamics.

Figure 6A:
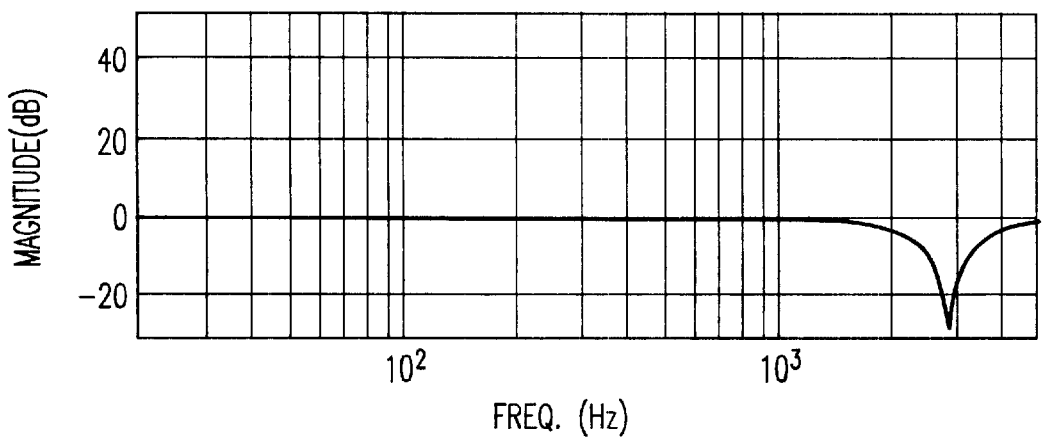
FIGS. 6A–6B illustrate that a transfer function of the feedback element resembles that of a notch filter.
Figure 6B:
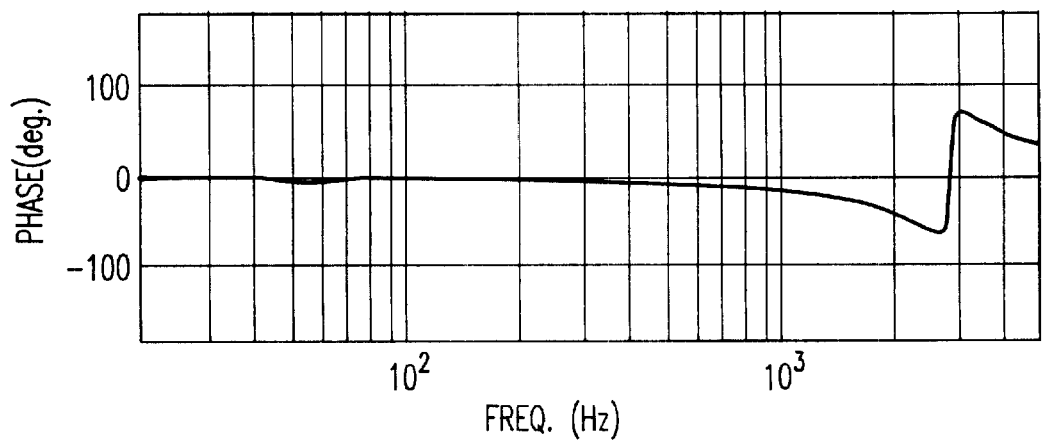

Computation of the transfer function of block A of FIG. 5C is shown in FIGS. 6A–6B. FIGS. 6A and 6B show, for example, that the notch is optimized for the mode. The magnitude and phase characteristics are very close to that of a notch filter in the attenuation region of about 3 kHz. However, strict analysis shows the presence of additional second order pole/zero pairs associated with the approximately 70 Hz resonance dynamics, but they play a negligible role in attenuating the CBR mode.

Hence, it has been shown that, for a given velocity feedback configuration, there is an equivalent notch function that will produce identical transfer function behavior.

With this observation, a multitude of notch filter designs can be constructed. Furthermore, it is noted that the traditional "deep" notch is an "over-design" to manage the CBR mode. Once the CBR mode shape is known, an optimum notch filter can be designed to provide attenuation just sufficient enough to keep the magnitude characteristics below a target level of the gain magnitude. Through this choice, the phase loss incurred by a traditional "deep" notch is eliminated.

Figure 7A:
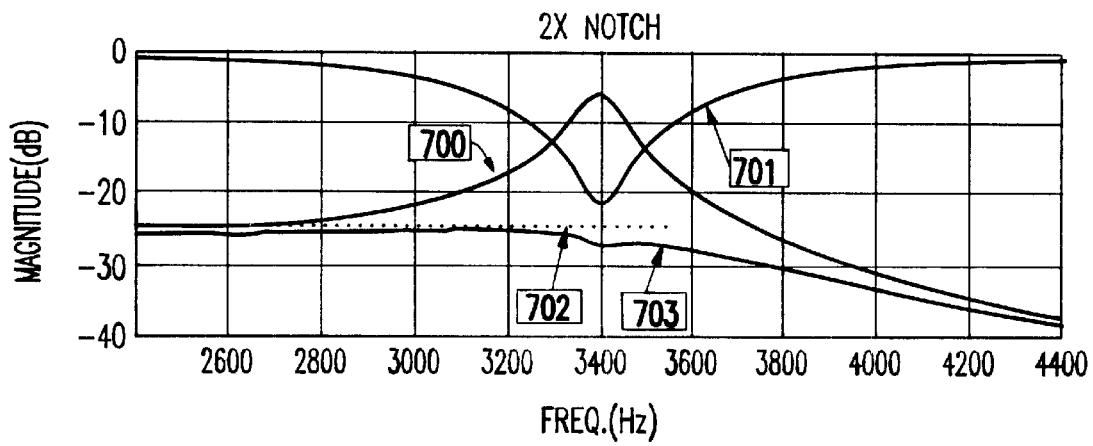
FIG. 7 illustrates a design of an optimum notch filter to match the actuator resonance mode.

FIG. 7A shows an optimum notch filter and the corresponding combined transfer function. In FIG. 7A, 700 illustrates an actuator mechanical transfer function with the coil bending frequency exactly matching notch frequency assuming no coil frequency drift for this notch. 701 illustrates an optimized notch for exact frequency match assuming no coil frequency drift. 702 illustrates a horizontal notch optimizing criterion, whereas 703 illustrates a transfer function of actuator added to the optimized notch.

Figure 7B:
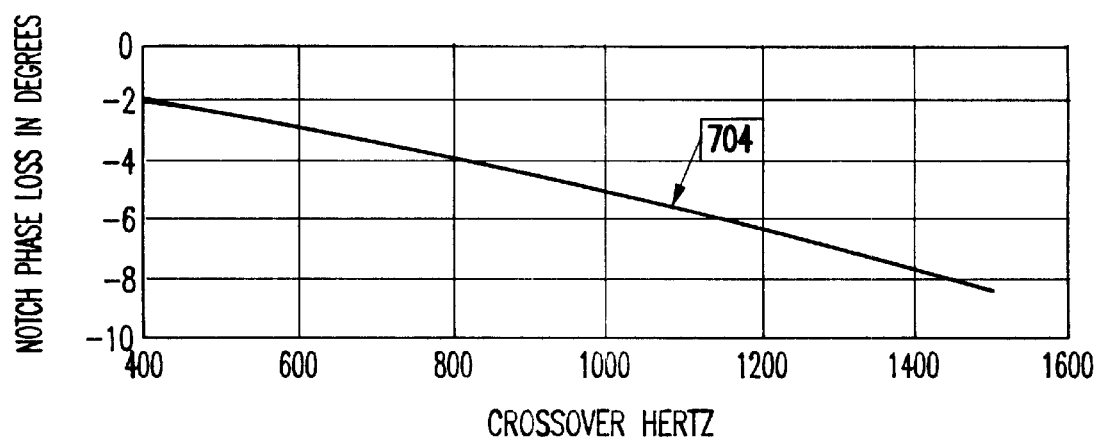

As shown in FIG. 7B, 704 illustrates the phase loss due to an optimum notch in the servo-crossover frequency region. Thus, FIGS. 7A and 7B show that an optimum notch becomes poor if drift occurs.

Figure 8A:
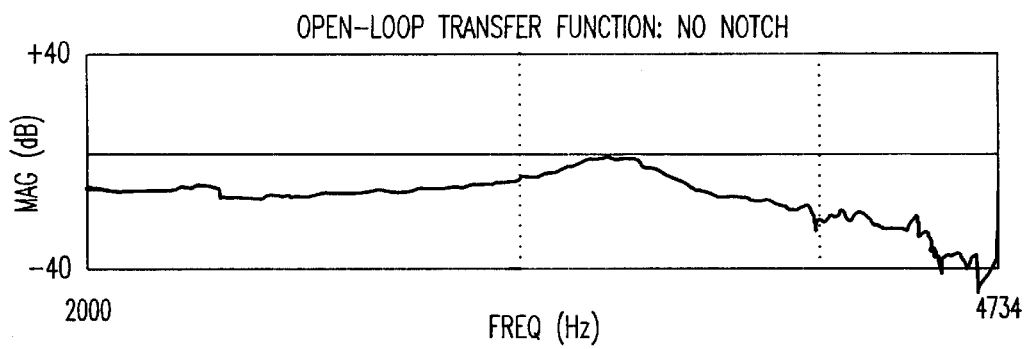
FIG. 8A illustrates a transfer function of the actuator without a notch filter.
Figure 8B:
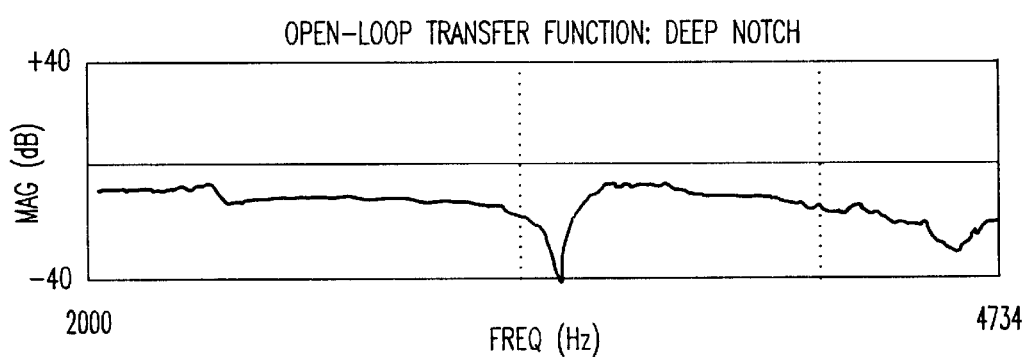
FIG. 8B illustrates a transfer function of the actuator with a conventional deep notch.
Figure 8C:
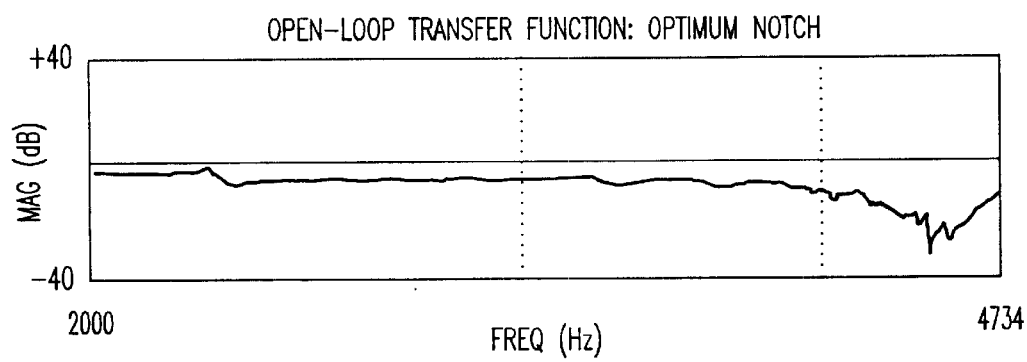
FIG. 8C illustrates a transfer function of the actuator with an optimum notch filter.

FIGS. 8A–8C show an experimental demonstration of the impact of "no" notch, a "deep" notch, and an "optimum" notch on the magnitude of the combined transfer function (TF).

FIG. 8A is the actuator open-loop TF without any notch filtering, whereas FIG. 8B corresponds to a "deep" notch. FIG. 8B is a typical product and shows the "overkill" of the mode frequency. The phase loss is great, as described above.

FIG. 8C corresponds to an optimum notch, and as shown achieves a substantially straight line function (magnitude) as compared to the waveform of FIG. 8B. In this case, the phase gain in the crossover frequency region of about 540 Hz due to an optimum notch is about 5 degrees.

However, the challenge of using an optimum notch is that the notch frequency must meet a matching criteria associated with the actuator TF under all operating conditions. However, the CBR resonance frequency is subject to change due to manufacturing variations, as well as due to rotating system (disk drive) temperature. A key feature of the invention is providing an optimum notch without providing an "overdesign" which accounts for CBR resonance mode drift attributable to manufacturing variations and temperature.

Figure 9:
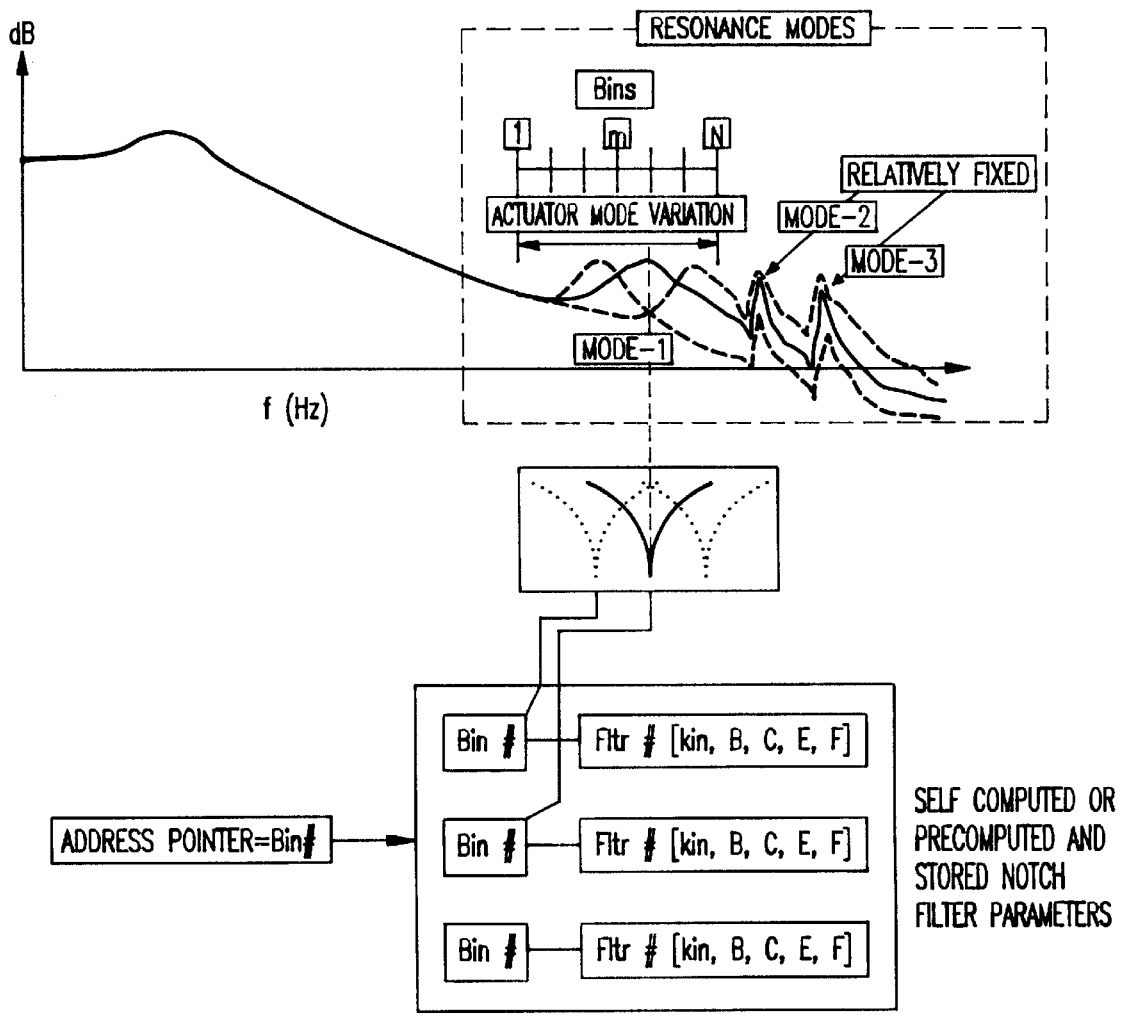
FIG. 9 illustrates a schematic of mode drift and a concept of bins for storage of an optimum notch parameter set.

FIG. 9 shows a schematic description of the resonance mode drift in a disk drive.

Mode-1 is subject to a significant frequency shift relative to other resonance modes (e.g., 2 and 3). Therefore, the Mode-1 frequency must be detected. The frequency range of Mode-1 can be estimated at early stages of a product (e.g., early in the life cycle of the subject product).

For 3.5" form factor disk drives, the Mode-1 frequency typically varies from about 3200 Hz to about 3800 Hz. The frequency range of about 600 Hz (=3800–3200) is divided into "N (=24)" bins with approximate 25 Hz increments. For each bin, a corresponding optimum notch parameter set is precomputed and stored in a table form. Thus, a range is defined in terms of bins (regions). Instead of a single broad notch to cover, for example 300 Hz, the invention forms a plurality of bins in case of a mode occurring in a particular bin. As such, a notch filter can be easily and optimally prepared. It is noted that more or less bins may be selected. Further, different increments may be selected by the designer. As shown in FIG. 9, an address pointer is used to select a bin number depending upon the mode level.

It is noted that, as shown in FIG. 9, the notch parameters can also be programmed to be computed in situ in case the bin size is required to be large (i.e., more than about 100) and the affordable memory space is limited. Thus, instead of a look-up table, the parameters may be computed in situ by a formula derivable using, for example, Z-transformation theory.

To select the appropriate "bin" number to configure a mode cancellation filter (i.e., an optimized notch), a simple, implementable methodology to estimate the resonance frequency in-situ is required. That is, a mechanism for determining a peak is advantageously utilized by the invention, since a deep notch filter is not employed by the invention. Instead, a notch filter is used which is optimally matched to the frequency.

Second Exemplary Step of the Invention

Thus, resonance frequency must be detected. However, a resonance frequency detection process requires a solution to two key challenges (e.g., namely the excitation signal generation and resonance feature detection).

Figure 10:
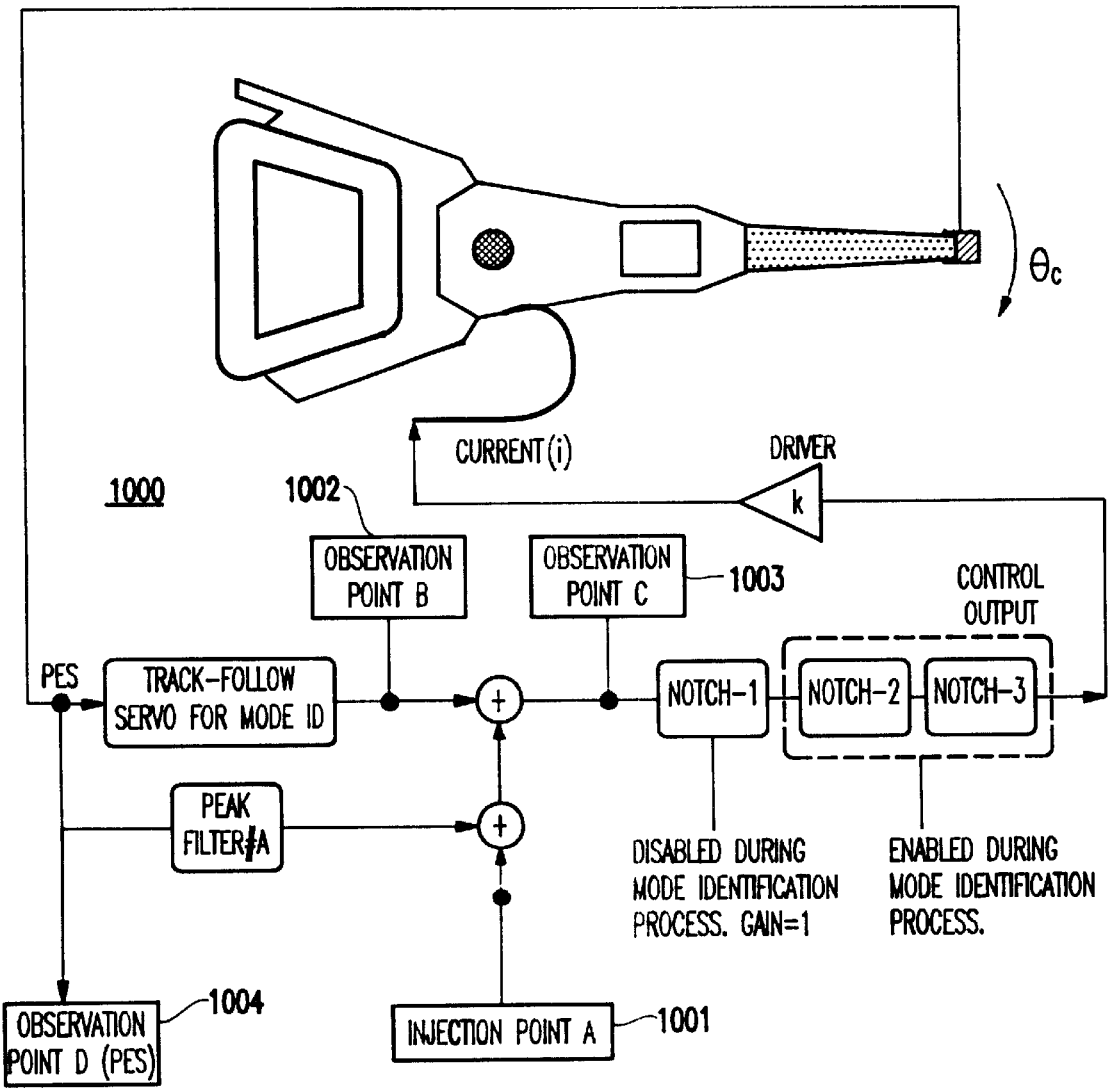
FIG. 10 illustrates a control system with signal injection and observation points (e.g., injection point A and observation points B, C, and D)

FIG. 10 shows a block diagram of a control system 1000 according to the present invention. The generated signal is injected (input) at point 1001 (e.g., "A"). The effect of signal injection on various signal pickup points, such as points 1002 (B), 1003 (C), or 1004 (D), can be studied to obtain the resonance feature of the actuator, as discussed below regarding a third exemplary step of the invention. Thus, injection point 1001 is used to generate local signals to excite the system.

The excitation signal utilizes a relatively low-cost hardware configuration to generate a sine-like (e.g., approximately sinusoidal) waveform with an ability to change its frequency in incremental steps. An approximation to a single frequency sine-wave is a square wave that can easily be generated using a digital clock signal. However, when a square wave is injected into a mechanical system having a transfer function that has several resonance features, multiple harmonics associated with the square-wave input can produce a complex response signal due to mixing of several harmonics (e.g., third and fifth harmonics). This is a problem.

Therefore, the present inventors discovered, through extensive testing, that a square wave injection is not an optimum input signal and is not a reliable means for establishing the resonance property of a disk drive actuator under all conditions.

That is, in selective actuator systems where higher harmonics and sampling rate do not produce interacting aliased modes, then a square-wave injection can be considered. However, the square-wave injection signal cannot be used for a disk drive actuator in all cases and under all conditions.

Figure 11A:
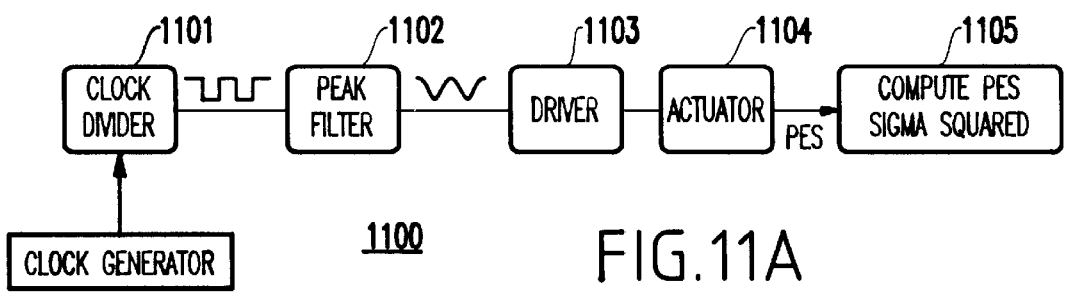
FIG. 11A illustrates a digital, low cost "sine" wave generator 1100 and method therefor.

Using elements shown in FIG. 11A, an approximate sinusoidal waveform may be generated digitally.

That is, a clock driver 1101 generates a controlled frequency output. The clock output amplitude is programmed to have a predetermined level. A peak filter 1102 (e.g., a digital filter) is programmed to have a narrow band/high-gain at a frequency identical to the clock input frequency. An output of the peak filter is sine-like, as shown, and is provided to the driver 1103 (which is the same as driver 103A shown in FIG. 1). The output of driver 1103 is provided to actuator 1104 (which is the same as VCM 101 shown in FIG. 1), which in turn produces a PES signal. A unit 1105 for computing the PES $\sigma^2$ (sigma squared) is provided to receive the PES.

Thus, this configuration produces an excitation signal that is approximately sine-like and that removes the negative effects of a square wave signal.

Figure 11B:
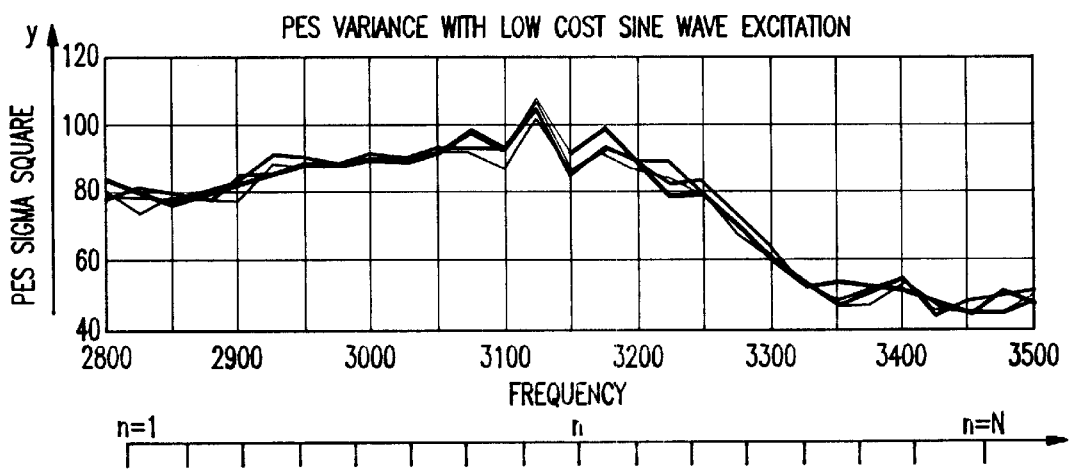
FIG. 11B illustrates a variance of a position error signal (PES) vs. bin using the digital sine wave generator of FIG. 11A.
Figure 11C:
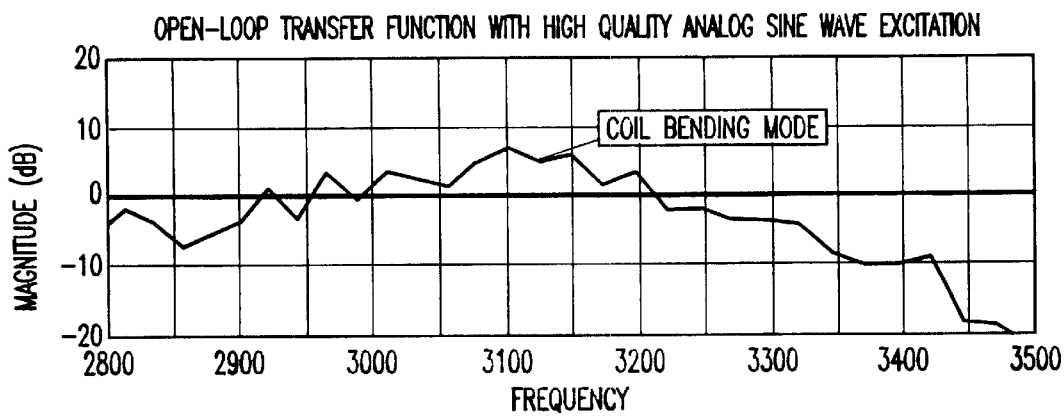
FIG. 11C illustrates a variance of PES using a high quality analog sine wave generator.

FIG. 11B shows the variance of PES plotted against each bin (or frequency point), which was verified by a relatively high cost machine under laboratory conditions, as shown in FIG. 11C. About 200 samples were used to compute each data point. FIG. 11B also confirms the repeatability of the resonance feature by superposing four (4) sets of data. In the experiment, a PES sampling frequency of 7.8 kHz was used.

Thus, FIGS. 11A and 11B illustrates that an approximate sine wave is produced by the peak filter having a frequency at the square wave frequency. It is noted that the injection point 1001 in FIG. 10 is a sine wave produced by the peak filter (e.g., for all bins).

Third Exemplary Step of the Present Invention

Thus, after a sine wave is generated by a peak filter, then a parameter (e.g., variance of PES) to be used is selected, as described below.

Resonance feature detection requires an effective choice of variables among all potentially available measurements. A robust measure of frequency parameters at which peak occurs is the basic requirement in choosing the appropriate variable. The PES is an especially important measurement variable.

The PES signal should indicate the maximum TF peaking associated with a resonance. It is also important to define the signal processing operation that should be performed on the variable. The signal processing can be performed in any of the time domain, the probabilistic domain, or the frequency domain.

It was found that a time domain detection of an absolute peak value of PES for each excitation was too sensitive to spurious noise, and a reliable signal peak detection as a function of injection signal frequency turned out to be difficult. Computing the signal energy (i.e., variance) in the probabilistic domain showed much more reliable results, as shown in FIG. 11B.

Performing a bandpass filter operation in time domain of PES for each injection frequency and estimating the amplitude of filter output also is possible. This operation corresponding to a frequency domain technique will provide a reliable estimate, but is known to take longer than variance computation.

Another measurement found to be robust was the ratio of the variance of signals (e.g., control signals) observed at observation points C and D of FIG. 10.

Fourth Exemplary Step of the Present Invention

Now, it is desirable to have a rational way to fit a curve (e.g., perform a curve fit) and find a bin which stores an optimal notch filter for use.

The variance values vs. bin number data when plotted should visually show a feature with a peak point. However, in a disk drive system, the measured variance information must be converted to an "estimate" of the bin number at which the resonance mode frequency occurs. Since the data is collected in the presence of disturbance and an imperfect injection signal, it is important to develop a statistically "optimal" estimate.

By assuming quadratic characteristics, represented by parameters a, b and c, for the data set composed of measured variance a least square curve fit is first achieved.

If z is the variance (or ratio of variances), then $z=a\times(n^2)+b\times n+c$, where n is the bin number.

For a range of measurements denoted by column vector $Z=(z1, z2, z3, \ldots zm)^T$, where $z1 \ldots zm$ denotes variance (or ratio of variances; for example, each of the bins will have a variance; 24 bins have 24 variances) at each measurement point, it can be shown that the least square estimate of the unknown parameter set $(a\ b\ c)^T=[P^TP]^{-1}P^TZ$ where P is a matrix composed of elements that are direct functions of bin number or of unity value. For a three parameter representation as shown in this example, the matrix $P=[1\ 1\ 1;\ 4\ 2\ 1; \ldots; m^2\ m\ 1]$. The superscript "T" denotes transpose and "−1" denotes inverse of a matrix.

Figure 12A:
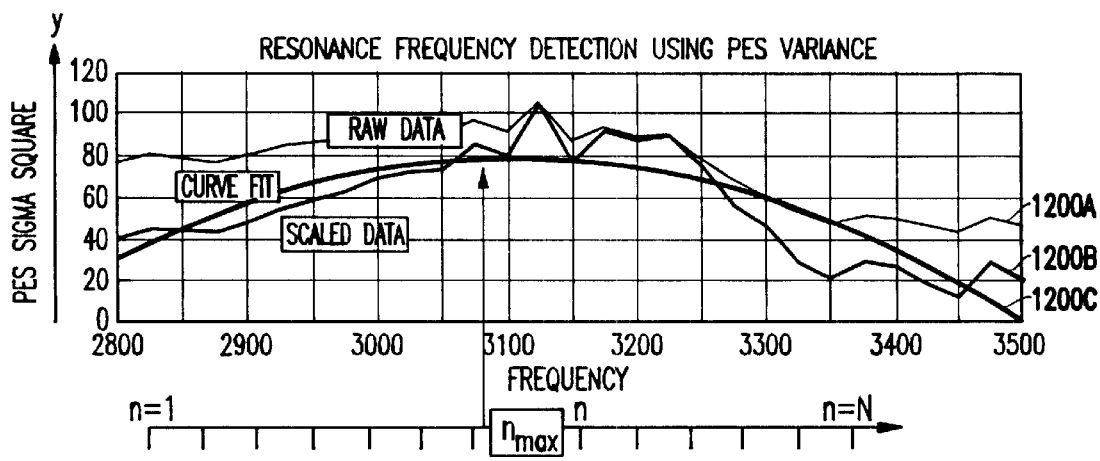
FIG. 12A illustrates a quadratic curve fit on a variance of PES.
Figure 12B:
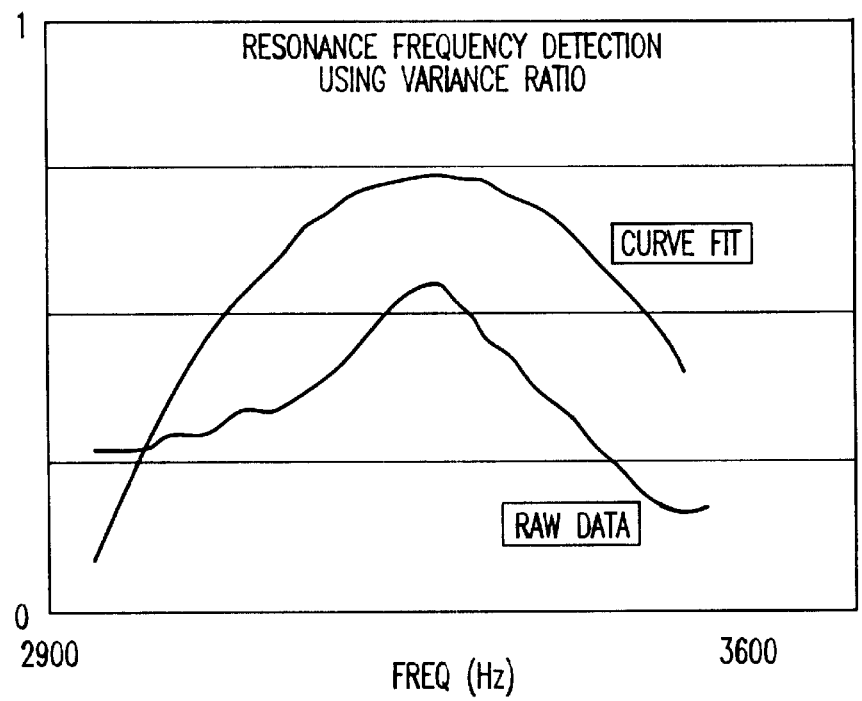
FIG. 12B illustrates a quadratic curve fit on a ratio of variances of a signal (e.g., control signal) at observation point B to observation point C (two different product platforms were used)

FIG. 12A shows three plots. One plot, 1200A, corresponds to a raw variance of PES. The second plot 1200B shows the variance value adjusted for frequency roll-off at approximately 40 dB/decade rate. This adjustment is necessary to obtain an accurate representation of the true-maximum point of the resonance bin value. The third plot 1200C shows a quadratically fitted curve. The quadratic curve fit 1200C represents the peak region fairly well. However, the actual parameter of interest is not the matching of the y-axis variable.

Instead, the bin value (e.g., $n_{max}$) at which the maximum occurs is the key parameter. This value is obtained by looking at the first gradient of the quadratically fitted curve. By equating the gradient value to zero, it can be shown that the bin number at which the maximum occurs is $=-b/2a$.

In the actual implementation, the operation required to compute a and b can be simplified into a series of multiply and add operation with measured sequence Z by pre-computing the matrix $[P^TP]^{-1}P^T$, and storing the first two raw vectors denoted by q and r. The operation can be further simplified by a frequency-weighted adjustment of the variance for the 40 dB/decade effect. It is noted that the 40 dB/decade roll of a direct signal will require a quadratic weighting.

However, a variance parameter of the signal will require another squaring operation, and hence a fourth power requirement. Thus, the frequency weighting of measured variance values of z is represented by the fourth power of a sequence of numbers [1, f2/fmin, f3/fmin . . . fmax/fmin] where fmin is the lowest frequency corresponding to the first bin number and fmax is the highest frequency corresponding to the last bin number.

In a variation of the implementation of the method described above, FIG. 12B shows the similar operation performed on the ratio of variances of the observed signal at point B (1002 in FIG. 10) to the injected signal at point C (1003). This ratio operation removes any transfer function distortion of open-loop, peak value that may occur when only the PES variance is used. Thus, instead of only using the PES variance, using variances at point B and at point C, then even less further distortion occurs, and the frequency induced distortion can be even further compensated.

The steps described above were successfully implemented in a product environment in which a peak was detected by a processor or the like, and then a bin with a notch optimized for that bin was selected.

However, a method to simplify the computation requirement or frequency of calibration due to environmental changes will open up an easy path for product inclusion. For example, a fifth exemplary step of the present invention simplifies the need for frequent in-situ CBR frequency determination.

Fifth Exemplary Step of the Present Invention

Figure 13A:
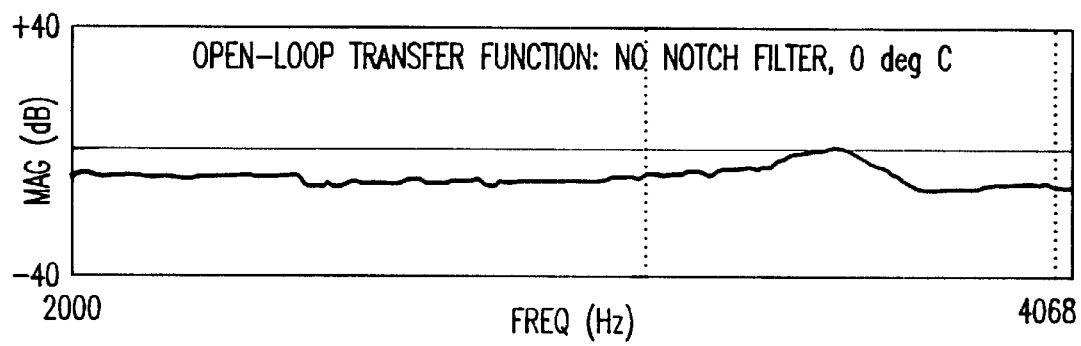
FIG. 13A illustrates an open-loop transfer function at low temperature.
Figure 13B:
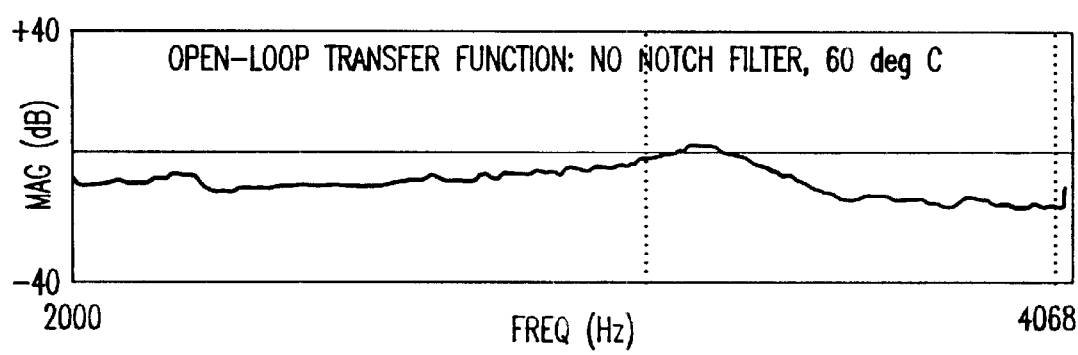
FIG. 13B illustrates an open-loop transfer function at high temperature.
Figure 14:
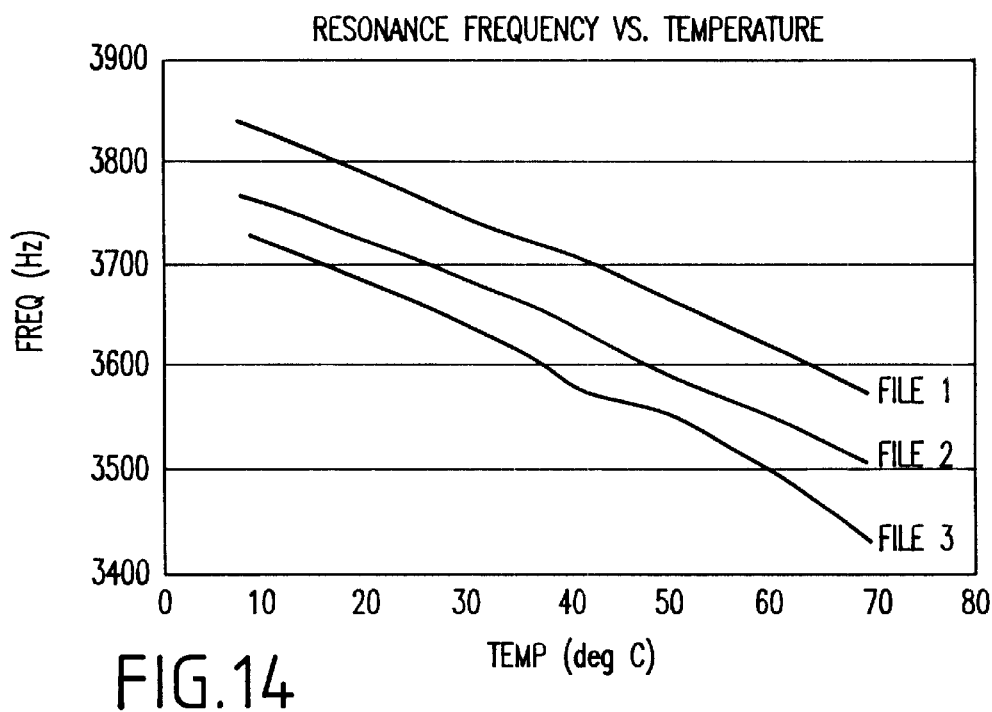
FIG. 14 illustrates the temperature dependence of a resonance frequency of three sample high density drives (HDDs)

A detailed measurement of CBR frequency at different temperatures extracted from open-loop transfer function data is presented in FIGS. 13A and 13B. This aspect of the invention is important for simplifying peak identification methods. Such measurements revealed a strong and nearly linear correlation to temperature, as shown in FIG. 14. That is, mode shift occurred with temperature variations. Three samples (e.g., files 1–3) were measured, and their correlation data is shown in FIG. 14.

As shown in FIG. 14 each file has a different resonance at a different temperature. Temperature is strongly correlated with resonance.

Each sample has an initial frequency that is off-set from each other, but the temperature dependence causes a predicable shift in the CBR frequency. Therefore, by measuring the initial peak frequency at the manufacturing line once along with the temperature of a drive, the future CBR frequency can be easily inferred using a temperature sensor-based measurement. This significantly simplifies the calculation and does not require the resource-intensive computation of the conventional techniques.

Figure 15:
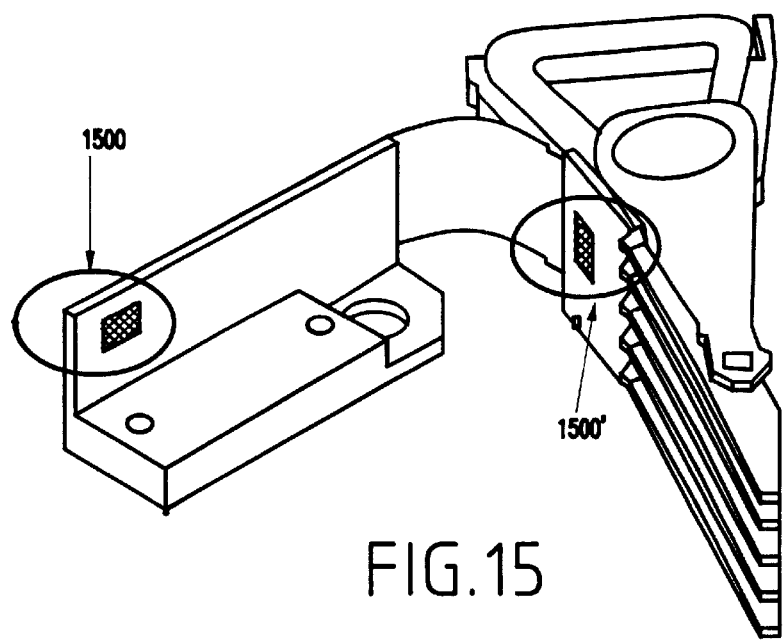
FIG. 15 illustrates a measured location (e.g., location "A") and an optimal location (e.g., location "B") of a temperature sensor.

FIG. 15 shows an embedded temperature sensor 1500 that is presently available in disk drives for various other reliability monitoring and control purposes. This sensor output can be productively used to predict the resonance frequency using prior data as shown in FIG. 14. The stored notch filter parameters can also be reduced by having a notch filter slightly conservative than an optimum notch. Instead of the conservative location of the temperature sensor 1500, the temperature sensor can be moved to an optimum location as shown by the position of temperature sensor 1500.

Figure 16A:
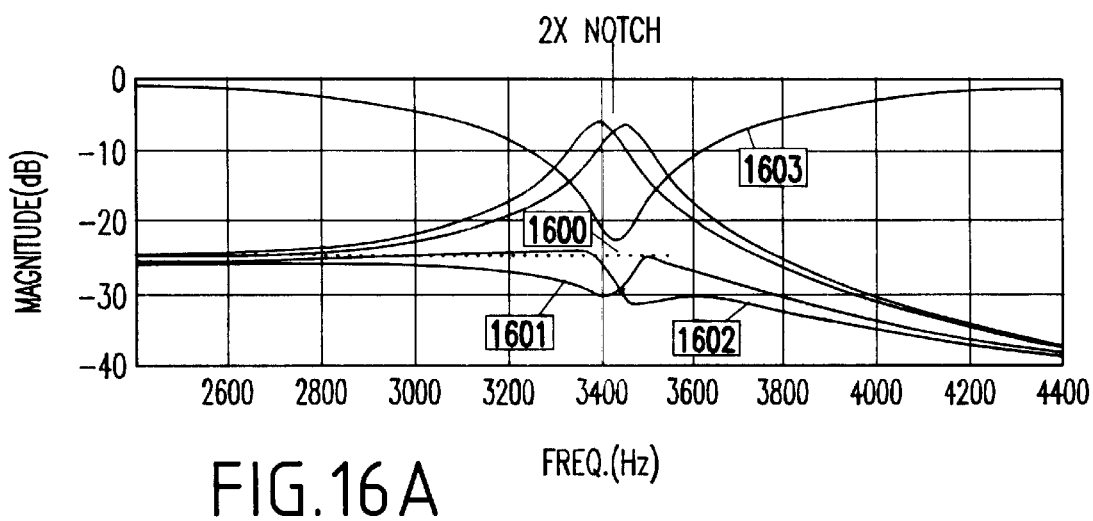
FIG. 16 illustrates a sub-optimum notch design to reduce short term temperature drift-induced sensitivity.
Figure 16B:
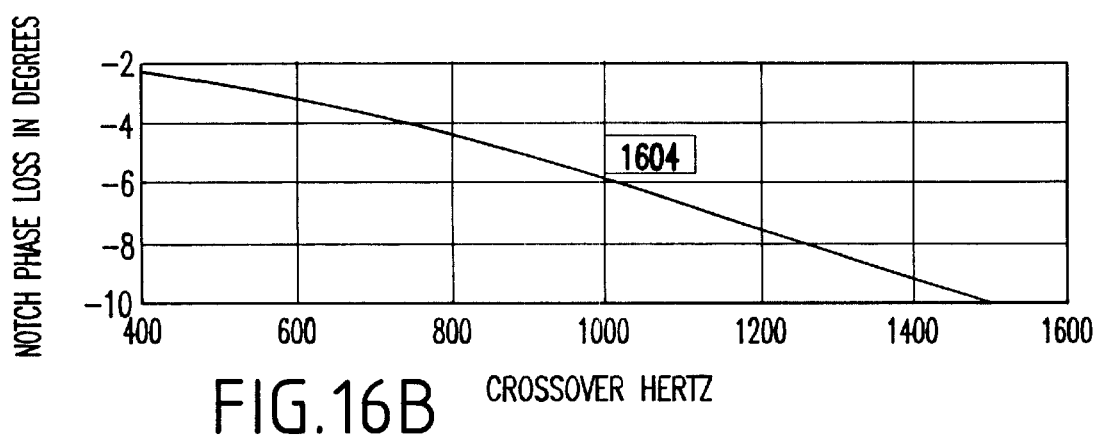

FIG. 16A shows an example design in which a substantially +/−25.0 Hz shift in actuator CBR frequency is managed by a notch that produces about 3.5 deg. phase loss at substantially 600 Hz frequency (e.g., see FIG. 16B). As shown in FIG. 16A, a horizontal notch optimizing criterion 1600 is shown.

Further, 1601 illustrates an actuator and optimized notch transfer function with coil mode drift of +25 Hz from the notch center frequency. 1602 illustrates an actuator and optimized notch transfer function with coil mode drift of −25 Hz from the notch center frequency. Finally, 1603 in FIG. 16A illustrates an optimized notch design for a coil mode drift of +/−25 Hz from the nominal center frequency. 1604 in FIG. 16B illustrates an optimized notch phase loss in a servo cross-over frequency region.

To facilitate the simplified implementation, a manufacturing cell is formed to contain a transfer function measurement system, as well as programmed to have a global table of optimum (or semi-optimum) notch filter parameters.

Thus, FIGS. 16A and 16B illustrate that if the number of notches is desired to be minimized, then some drift may occur.

Figures 17A, 17B:
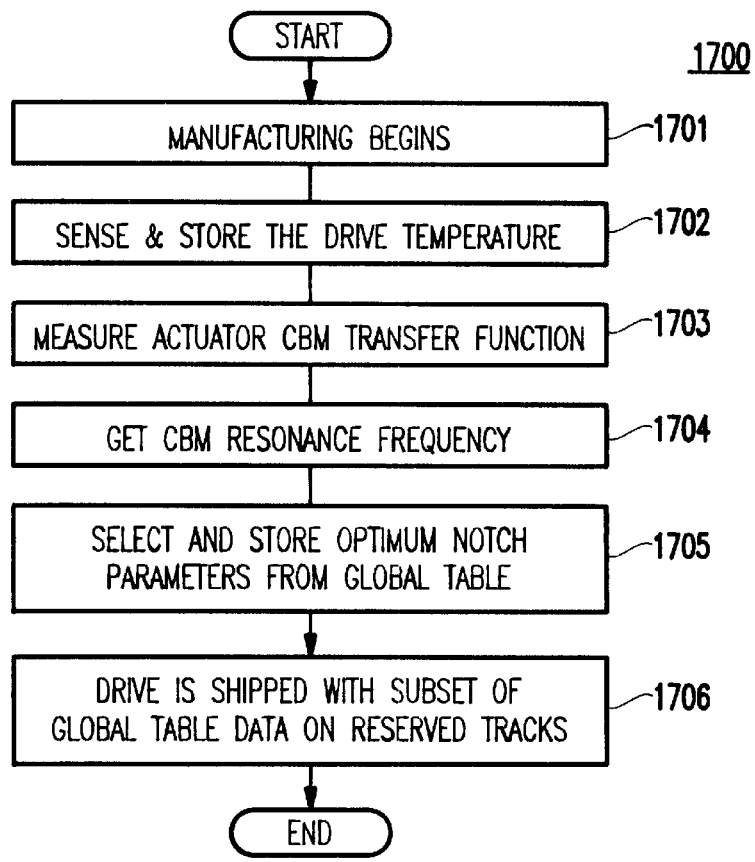
FIG. 17A illustrates a flowchart of an algorithm at manufacturing line initiation of a parameter table.
FIG. 17B illustrates a typical parameter(s) table.

FIG. 17A shows a flowchart which defines a method 1700 of operation of the present invention. Specifically, as shown in step 1701, manufacturing starts. In step 1702, the operating drive temperature is sensed and stored. Thereafter, in step 1703, the actuator CBM transfer function is measured.

In step 1704, the CBM resonance frequency is obtained.

In step 1705, based on detected peak frequency, a corresponding limited range of notch filter parameters are selected and stored along with other parameters, such as those defined in the table of FIG. 17B, onto the drive. For example, these parameters are available at the local cell and may include 24 values in the example above.

In step 1706, such a subset of global table data is saved in the reserved tracks of the drive.

Figure 18:
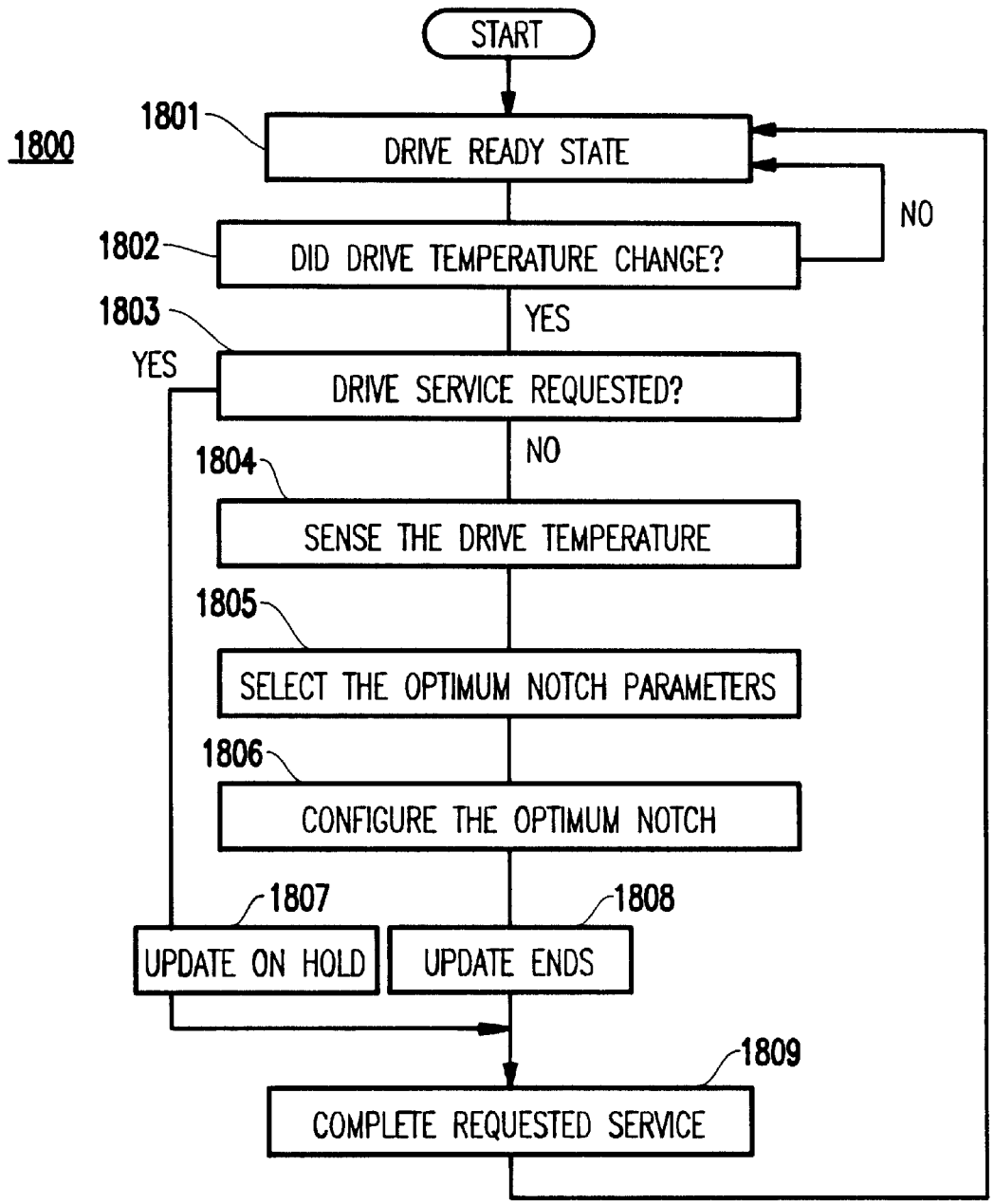
FIG. 18 illustrates a flowchart of an algorithm for optimum notch implementation with a temperature sensor.

FIG. 18 shows a method 1800 of operation used to implement the CBM resonance compensation system optimized for temperature drift only. Thus, this method relies only on the temperature sensor, and does not require all of the parameters shown in the parameter table of FIG. 17B. Hence, this technique is simplified over the method described above.

In case the temperature dependence of CBR frequency is anticipated to change over a period of time after the drive has been shipped to a customer, a method is required to refine the temperature dependence table. This is facilitated by including the in-situ peak detection method as part of the product microcode.

In step 1801, the drive is placed in a ready state.

In step 1802, it is determined whether the drive temperature has changed or not. If the drive temperature has not changed, the process loops to step 1801.

If the drive temperature has changed, then the process continues to step 1803 at which it is determined whether drive service (e.g., read or write customer data) has been requested. If drive service has been requested, the process loops to step 1807 to place the update operation on hold temporarily, until the drive service has been completed (e.g., which may take seconds to minutes).

If no drive service has been requested as determined in step 1803, then in step 1804 the drive temperature is sensed.

In step 1805, the optimum notch parameters are obtained. (e.g., from the table in FIG. 17B).

In step 1806, the optimum notch is configured, and in step 1808 the update ends. In step 1809, the service requested has been completed and the process loops back to step 1801. In "ready state", the drive is ready to service the customer requests.

Figure 19:
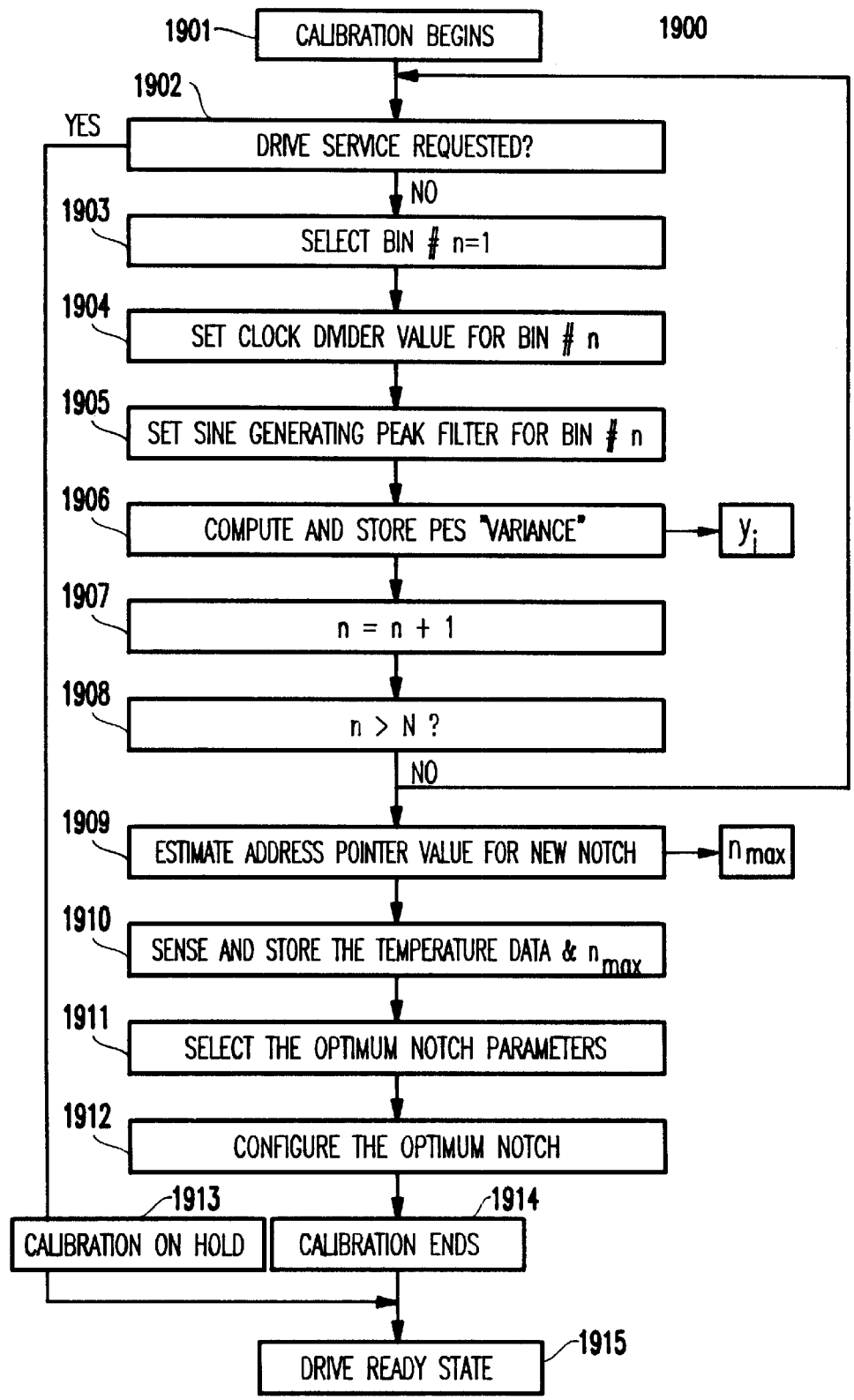
FIG. 19 illustrates a calibration method according to the present invention.

Whenever possible, for example, when the drive is in an idle mode and the temperature has drifted to a new value, a calibration operation 1900 can be attempted as shown in FIG. 19. The calibration operation can be temporarily interrupted if a service by the drive is needed.

It is noted that FIG. 19 combines temperature drift and peak detection methods (and calibration). At each temperature; the peak values are updated, since temperature dependent resonance could change over time. The method utilizing the temperature is much quicker than the method described above. For example, a least square estimation may take on the order of 2 seconds, whereas a temperature data sensing operation, as described, is on the order of microseconds.

Turning to the process shown in FIG. 19, in step 1901, the calibration begins.

In step 1902, it is determined whether the drive service has been requested or not. If the drive, service has been requested, the process loops to step 1913, to place the calibration on hold for a predetermined time period (e.g., typically taking between seconds to minutes depending on the number of users trying to access the drive).

If the drive service has not been requested, then the process continues to step 1903, and a bin number of n=1 to selected.

Thereafter, in step 1904, a clock divider value is set for bin #n. In step 1905, the sine generating peak filter is set for bin #n.

In step 1906, the PES variance is computed (e.g., $y_i$) and stored. It is noted that a ratio of PES variance at point D or the control signal at points B and C may be employed instead.

In step 1907, n is incremented by "1", and in step 1908 it is determined whether n>N.

If it is determined that n is not greater than N (e.g., "NO" in step 1908), then the process loops back to step 1902. Conversely, if "YES" in step 1908, then in step 1909, the address pointer value for a new notch is estimated (e.g., $n_{max}$).

In step 1919, the temperature data is sensed and stored along with $n_{max}$. Then, in step 1911, the optimum notch parameters are stored.

In step 1912, the optimum notch is configured, and in step 1914 the calibration ends. The drive is now in the ready state as shown in step 1915.

Thus, whenever possible, for example, when the drive is in an idle mode and the temperature has drifted to a new value, the calibration operation 1900 can be attempted as shown in FIG. 19. The calibration operation can be temporarily interrupted if a service by the drive is needed. It is noted that the entire range of temperatures need not be examined (swept), but only the drive's operating temperatures which constitute a temperature subset.

Figure 20:
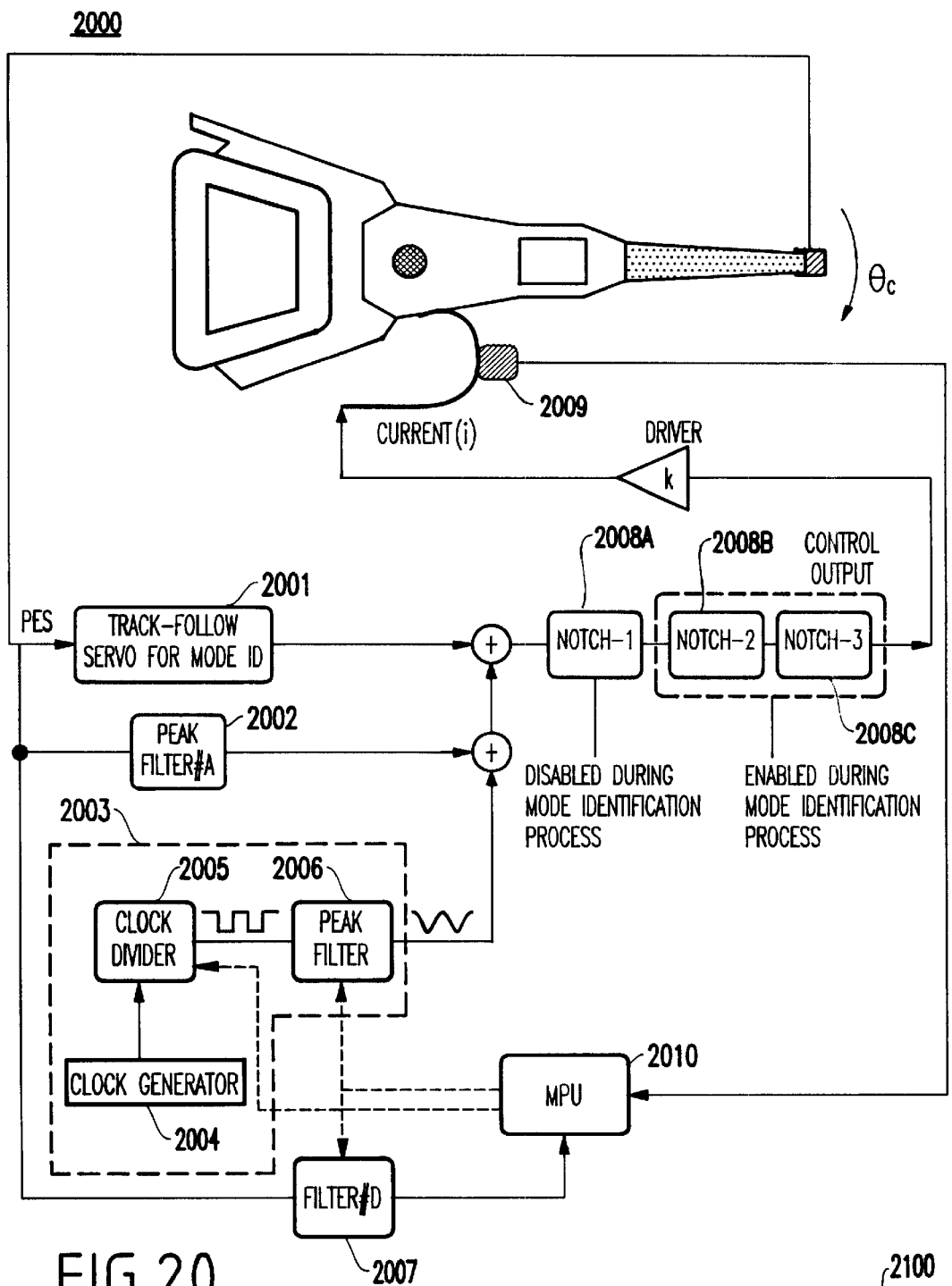
FIG. 20 illustrates a comprehensive optimum notch implementation system.

FIG. 20 illustrates an exemplary overall system 2000 which provides a full implementation of the concept of the present invention and the flowchart of FIG. 19.

As shown in FIG. 20, the system 2000 includes a basic track-follow servo 2001 with a fundamental harmonic peak filter 2002, and a relatively low-cost sine wave generator 2003 using a clock 2004, a clock divider 2005 and a peak filter 2006.

Further included are a general method to observe the PES through a signal processing filter 2007, and a series of notch filters 2008A, 2008B, 2008C, etc. with the first notch disabled during the CBM detection phase.

Additionally, a temperature sensor 2009 is included to assist the simple address pointer for notch parameter lookup. That is, the temperature sensor 2009 provides an input to the main processing unit (MPU) 2010.

The filter (e.g., #D) 2007 can be an operation (e.g., through software or the like) to compute variance as discussed in this invention, or it could be a peak-filter having identical frequency as the injection peak-filter.

Figure 21:
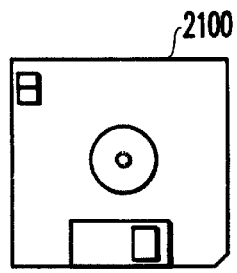
FIG. 21 illustrates a storage medium for storing steps of the program for adaptive resonance mode cancellation in a rotating storage system.

Thus, as shown in FIG. 21, in addition to the hardware and process environment described above, a different aspect of the invention includes a computer-implemented method for adaptive resonance mode cancellation servo in a rotating storage system, as described above. As an example, this method may be implemented in the particular hardware environment discussed above.

Such a method may be implemented, for example, by operating the MPU 2010 (FIG. 20), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the MPU 2010 and hardware above, to perform a method of adaptive resonance mode cancellation servo in a rotating storage system, as described above.

As an example, this signal-bearing media may include, for example, a RAM (not shown) contained within the MPU 2010, as represented by the fast-access storage for example. Alternatively, the instructions may be contained in another signal-bearing media, such as a magnetic data storage diskette 2100 (FIG. 21), directly or indirectly accessible by the MPU 2010.

Whether contained in the diskette 2100, the computer/MPU 2010, or elsewhere, the instructions may be stored on a variety of machine-readable data storage media, such as DASD storage (e.g., a conventional "hard drive" or a RAID array) magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

For example, when multiple resonances are present in a system, each mode frequency can be detected and compensated using a similar technique. One mode is detected while other modes are kept attenuated using conservative notch filters.

What is claimed is:

1. A method of adaptive resonance cancellation in a rotating magnetic storage system, comprising:

designing a set of digitally selectable optimum resonance cancellation filters;

generating a series of excitation signals for input to the filters;

generating a characteristic resonance frequency based on said excitation signals; and computing an address pointer corresponding to the resonance frequency, to select an optimum resonance cancellation filter in said rotating magnetic storage system, wherein a variance of a position error signal (PES) is utilized in selecting an optimum resonance cancellation filter having a predetermined resonance frequency characteristic and for performing adaptive resonance cancellation.

2. The method according to claim 1, wherein said filters have an open loop transfer function having a substantially linear waveform.

3. A method of adaptive resonance cancellation in a rotating storage system, comprising:

designing a set of digitally selectable optimum resonance cancellation filters;

generating a series of excitation signals for input to the filters;

generating a characteristic resonance frequency based on said excitation signals; and computing an address pointer corresponding to the resonance frequency, to select an optimum resonance cancellation filter, wherein a resonance frequency detection is performed by using a ratio of variances of control signals sampled at various positions within said system.

4. The method according to claim 1, wherein said excitation signals comprise waveforms having a substantially sinusoidal shape.

5. The method according to claim 1, further comprising:

using a temperature sensor to sense a temperature of said system so as to select a desired one of said optimum resonance cancellation filters.

6. The method according to claim 1, further comprising:

providing a table including a plurality of parameters for determining an optimum filter.

7. The method according to claim 1, further comprising:

providing a table correlating system temperature vs. resonance frequency.

8. The method according to claim 7, further comprising:

updating said table correlating system temperature vs. resonance frequency, to compensate for a variation in resonance properties over time.

9. The method according to claim 6, wherein said table is divided by a number of bins, said number of bins being divided by a frequency range of said characteristic resonance frequency, such that each bin covers a predetermined portion of said frequency range.

10. The method according to claim 9, further comprising:

selecting a conservative filter so as to reduce the number of bins in said table.

11. The method according to claim 1, further comprising:

providing a parameter look-up table for storing changes in mode shape and mode frequency, and which is accessed by said address pointer for selecting an optimum filter based on said changes.

12. The method according to claim 1, further comprising:

sensing a temperature of said system and selecting an optimum filter based on said temperature sensed, such that variations in resonance properties over time are compensated.

13. A method of optimally controlling a disk drive having a notch filter in a servo loop, comprising:

sensing a temperature of said drive during a manufacturing of said drive;

storing, in a table, parameters corresponding to said temperature sensed; and optimally adjusting a notch filter in a servo loop in said drive based on an output of said table.

14. A method of adaptive resonance cancellation in a rotating storage system, said system including an actuator coil and a plurality of notch filters, said method comprising:

sensing an operating temperature of said system;

measuring an actuator coil bending mode (CBM) transfer function;

obtaining the CBM resonance frequency based on said transfer function and said temperature sensed;

based on detected peak frequency of said resonance frequency, selecting and storing optimum notch filter parameters and other parameters; and saving a subset of global table data in predetermined tracks of the system.

15. A method of adaptive resonance cancellation in a rotating storage system by updating a temperature dependence table stored therein, said method, comprising:

sensing a temperature of said system;

determining whether a system temperature has changed;

if the system temperature has changed, then determining whether a system service has been requested;

if the system service has been requested, then halting a table updating operation until the system service has been completed;

if no system service has been requested, then obtaining optimum notch filter parameters based on said temperature sensed; and configuring the optimum notch filter based on the optimum notch filter parameters.

16. A method of adaptive resonance cancellation for a rotating storage system by selecting an optimum notch filter from a plurality of notch filters, said rotating storage system including a parameter table divided into a plurality of bins for a characteristic resonance frequency range, such that each bin covers a predetermined portion of said frequency range, said method comprising:

determining whether a system service has been requested or not;

if the system service has not been requested, selecting a bin number of n=1;

setting a clock divider value and a sine generating peak filter for the bin #n;

computing one of a position error signal (PES) variance at a predetermined point and control signals at other predetermined points in said system;

incrementing n by "1", and determining whether n>N, where N is a total number of bins;

if it is determined that n is not greater than N, then repeating the above operations;

if it is determined that n is greater than N, then estimating an address pointer value for a new notch filter;

sensing a temperature of said system and storing said temperature along with said new notch filter;

storing optimum notch parameters; and configuring an optimum notch filter.

17. The method according to claim 16, wherein when said system service is requested, said method is halted until said system service is completed.

18. A rotating storage system, comprising:

a generator for generating an excitation signal;

a detector for detecting a variance of the excitation signal; and an estimator for judging a best value for a parameter for controlling a variance of the excitation signal.

19. The rotating storage system of claim 18, further comprising:

a temperature sensor for sensing a temperature of said system for estimating said parameter.

20. A disk drive, comprising:

a temperature sensor for sensing a temperature of said drive during a manufacturing of said drive;

a parameter table for storing parameters corresponding to said temperature sensed; and an adjustor for optimally adjusting a notch filter in a servo loop in said drive based on an output from said parameter table.

21. A rotating magnetic storage system, comprising:

a plurality of digitally selectable optimum resonance cancellation filters;

a generator for generating a series of excitation signals;

a frequency generator for generating a characteristic resonance frequency based on said excitation signals; and a computer for computing an address pointer corresponding to the resonance frequency to select an optimum resonance cancellation filter in said rotating magnetic storage system, wherein a variance of a position error signal (PES) is utilized in selecting said optimum resonance cancellation filter having a predetermined resonance frequency characteristic and for performing adaptive resonance cancellation.

22. The system according to claim 21, wherein said filters have an open loop transfer function having a substantially linear waveform.

23. A rotating storage system, comprising:

a plurality of digitally selectable optimum resonance cancellation filters;

a generator for generating a series of excitation signals;

a frequency generator for generating a characteristic resonance frequency based on said excitation signals; and a computer for computing an address pointer corresponding to the resonance frequency, wherein a resonance frequency detection is performed by using a ratio of variances of control signals sampled at various positions within said system.

24. The system according to claim 21, wherein said excitation signals comprises waveforms having a substantially sinusoidal shape.

25. The system according to claim 21, further comprising:

a temperature sensor for sensing a temperature of said system and for providing an input so as to select a desired one of said optimum resonance cancellation filters.

26. The system according to claim 21, further comprising:

a table including a plurality of parameters for determining an optimum filter.

27. The system according to claim 21, further comprising:

a table correlating system temperature vs. resonance frequency.

28. The system according to claim 27, further comprising:

an updater for updating said table correlating system temperature vs. resonance frequency, to compensate for a variation in resonance properties over time.

29. The system according to claim 26, wherein said table is divided by a number of bins, said number of bins being divided by a frequency range of said characteristic resonance frequency, such that each bin covers a predetermined portion of said frequency range.

30. The system according to claim 29, wherein a number of bins in said table is reduced by selecting a filter having a predetermined characteristic.

31. The system according to claim 21, further comprising:

a parameter look-up table for storing changes in mode shape and mode frequency, and which is accessed by said address pointer for selecting an optimum filter based on said changes.

32. The system according to claim 21, further comprising:

a temperature sensor for sensing a temperature of said system and selecting an optimum filter based on said temperature sensed, such that variations in resonance properties over time are compensated.

33. A signal-bearing medium tangibly embodying a program of machine-readable instructions executable by a digital processing apparatus to perform a method for computer-implemented adaptive resonance cancellation in a rotating storage system, said method comprising:

designing a set of digitally selectable optimum resonance cancellation filters;

generating a series of excitation signals;

implementing an algorithm to generate a characteristic resonance frequency based on said excitation signals;

computing an address pointer corresponding to the resonance frequency; and based on said computing, using a temperature sensor to select an optimum resonance cancellation filter.

* * * * *